(12) United States Patent
Shin et al.

(10) Patent No.: US 8,478,366 B2
(45) Date of Patent: Jul. 2, 2013

(54) MOBILE TERMINAL

(75) Inventors: Duck Moon Shin, Gwangmyeong-si (KR); Seong Young Seo, Bucheon-si (KR); Jeong Hyuk Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 12/581,703

(22) Filed: Oct. 19, 2009

(65) Prior Publication Data
US 2010/0099458 A1  Apr. 22, 2010

(30) Foreign Application Priority Data

Oct. 20, 2008 (KR) .................. 10-2008-0102534
Nov. 13, 2008 (KR) .................. 10-2008-0112841
Feb. 26, 2009 (KR) .................. 10-2009-0016322

(51) Int. Cl.
*H04M 1/00* (2006.01)
*G03B 21/14* (2006.01)
*G03B 21/00* (2006.01)

(52) U.S. Cl.
USPC .................. 455/575.1; 455/556.1; 455/575.3; 455/575.4; 455/566; 353/119; 353/122

(58) Field of Classification Search
USPC ......... 455/575.1, 575.3, 575.4, 566; 353/119, 353/122
See application file for complete search history.

(56) References Cited

U.S. PATENT DOCUMENTS

| 2002/0063855 | A1 | 5/2002 | Williams |
| 2005/0104955 | A1* | 5/2005 | Navntoft .................... 348/14.02 |
| 2005/0192066 | A1* | 9/2005 | Park et al. .................. 455/575.3 |
| 2006/0077266 | A1* | 4/2006 | Nurmi ........................... 348/239 |
| 2006/0238637 | A1* | 10/2006 | Goto et al. ............... 348/333.06 |
| 2007/0060214 | A1* | 3/2007 | Sung et al. ................. 455/575.1 |
| 2007/0191077 | A1* | 8/2007 | Shin .......................... 455/575.3 |
| 2008/0018591 | A1* | 1/2008 | Pittel et al. .................... 345/156 |
| 2008/0186414 | A1* | 8/2008 | Pan .............................. 348/744 |

FOREIGN PATENT DOCUMENTS

| EP | 1445920 A2 | 8/2004 |
| EP | 1791329 A1 | 5/2007 |
| GB | 2384381 A | 7/2003 |
| JP | 8-223492 A | 8/1996 |
| WO | WO 2007/000490 A1 | 1/2007 |
| WO | WO 2007/040322 A1 | 4/2007 |

* cited by examiner

*Primary Examiner* — Jean Gelin
*Assistant Examiner* — Dung Hong
(74) *Attorney, Agent, or Firm* — Birch, Stewart, Kolasch & Birch, LLP

(57) ABSTRACT

A mobile terminal is disclosed. Specifically, in a mobile terminal having an image photographing or projecting function, the present invention is able to change a photographing or projecting angle of the mobile terminal into a horizontal or vertical direction. And, the present invention is able to change a display direction of an image displayed on a display unit of the mobile terminal in correspondence with the changed photographing or projecting angle to correspond to the changed photographing or projecting angle.

5 Claims, 18 Drawing Sheets

Fig.17
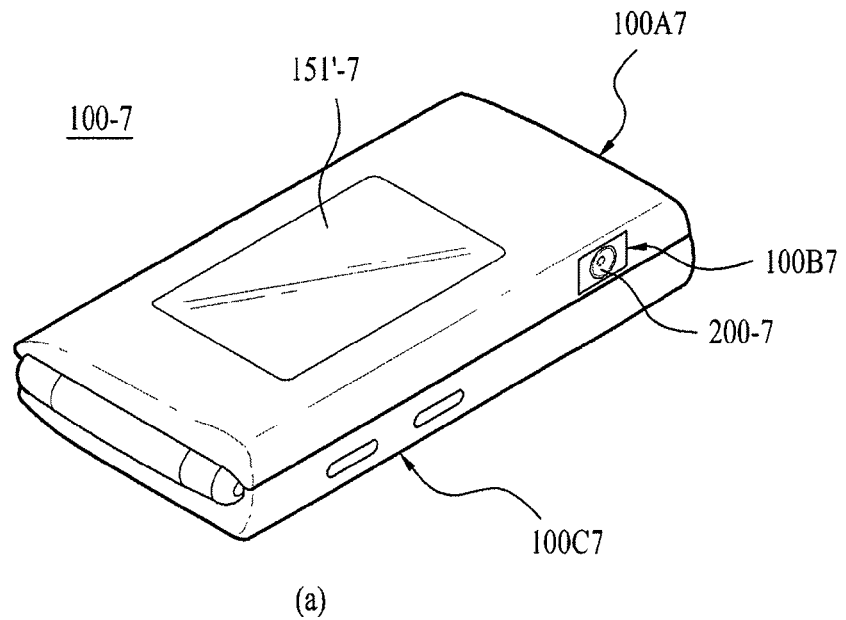
(a)
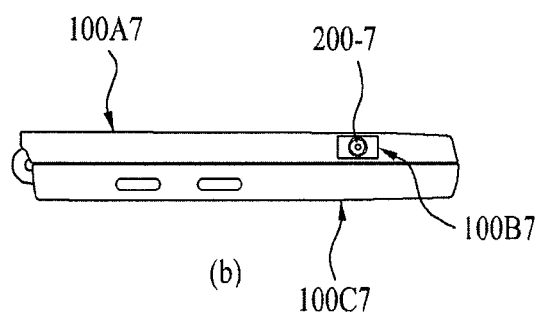
(b)
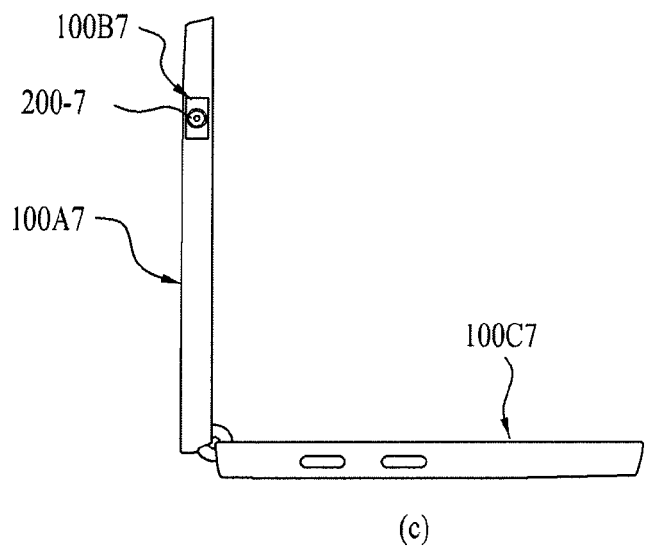
(c)

Fig.18
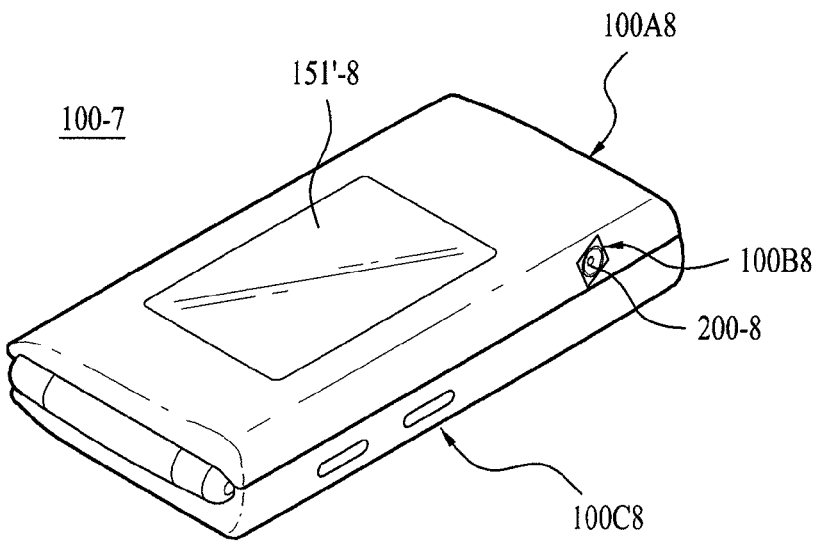
(a)
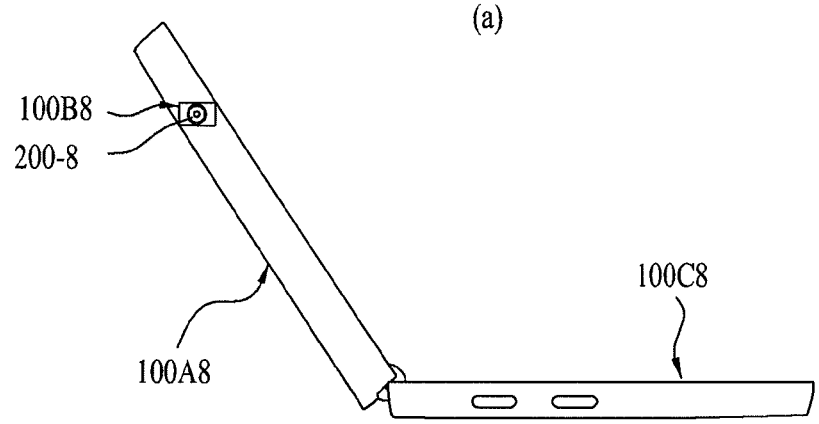
(b)
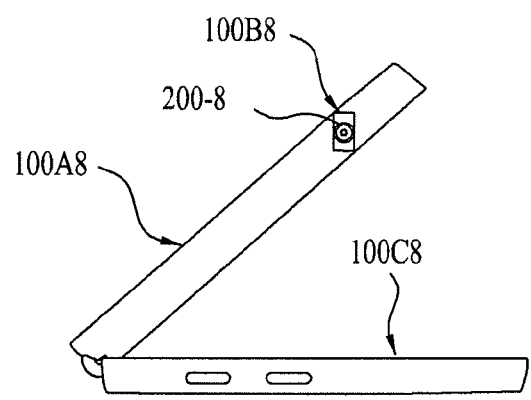

Fig.19
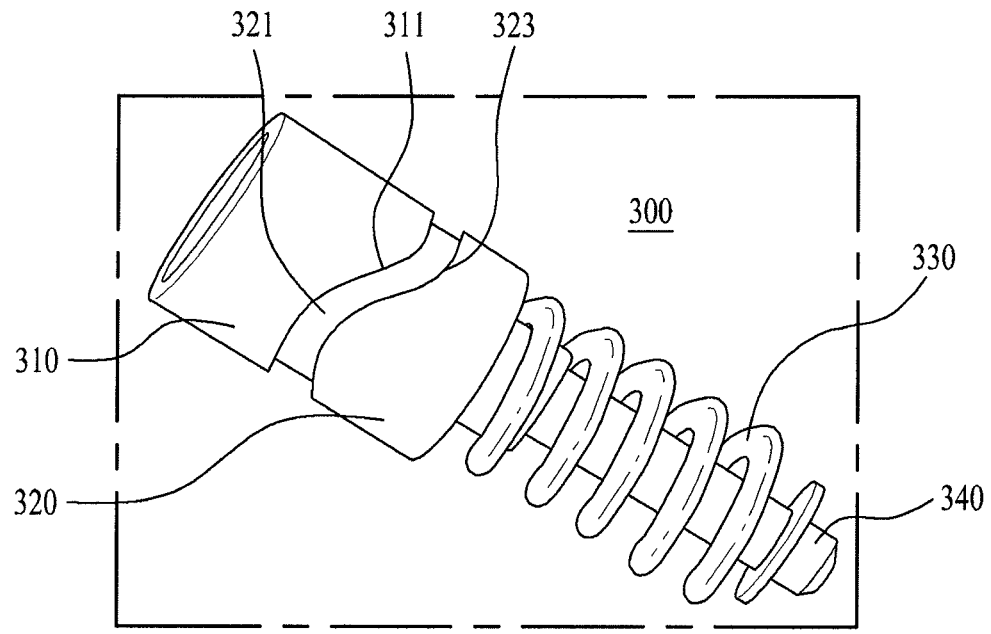
(a)
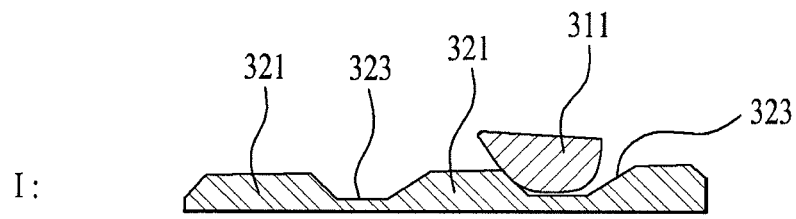
I :
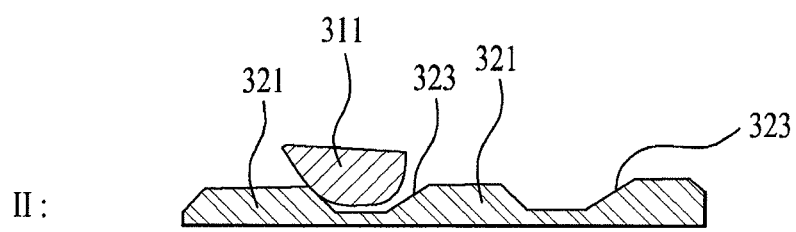
II :
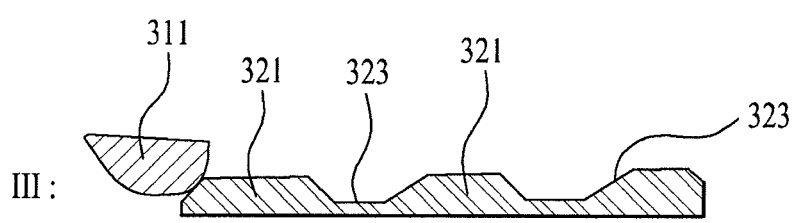
III :

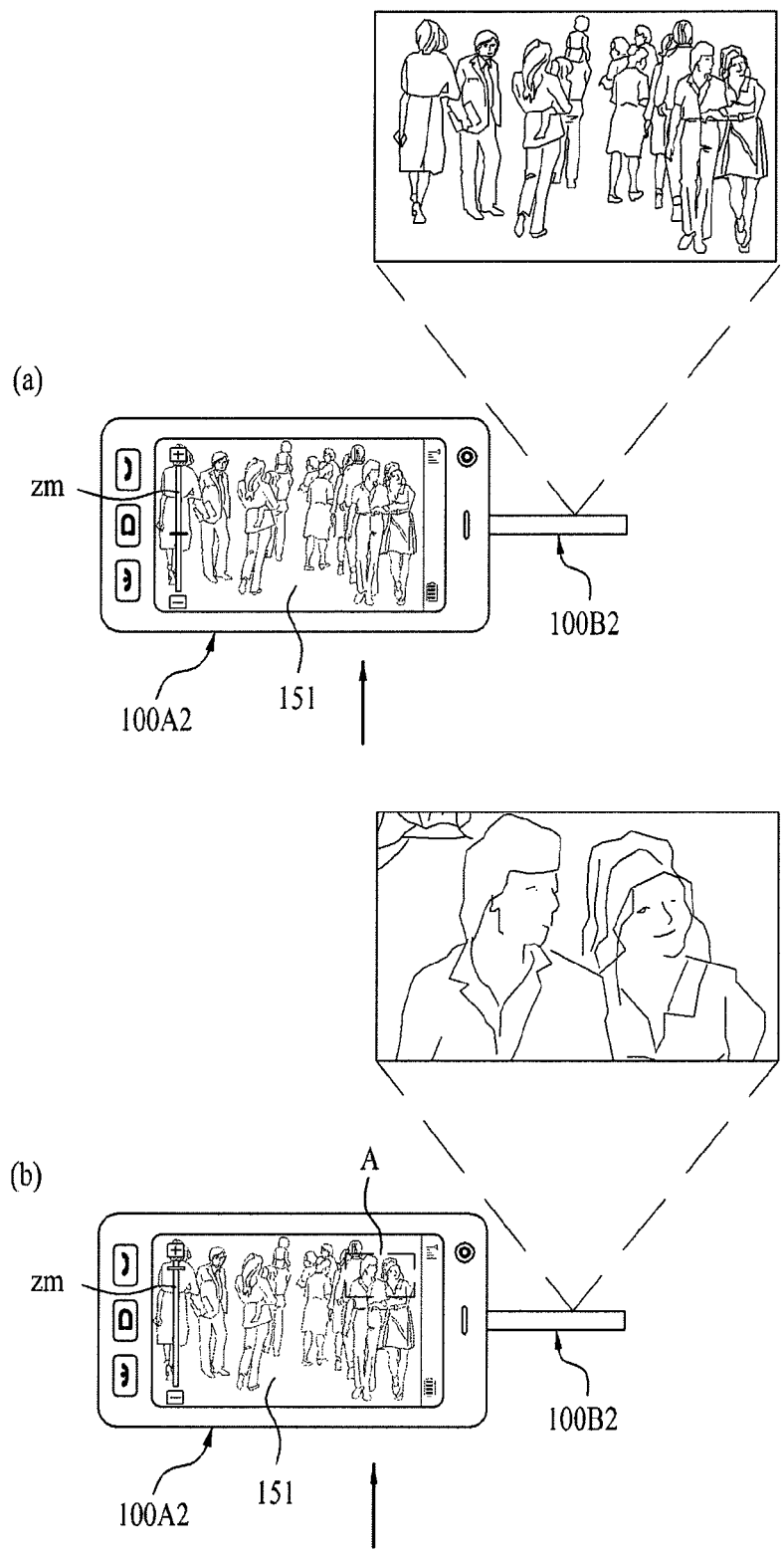

MOBILE TERMINAL

Pursuant to 35 U.S.C. §119(a), this application claims the benefit of earlier filing date and right of priority to Korean Application Nos. 10-2008-0102534 filed on Oct. 20, 2008; 10-2008-0112841 filed on Nov. 13, 2008 and 10-2009-0016322 filed on Feb. 26, 2009, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for adjusting a photographing angle or a projection angle in at least one direction or changing a direction of an image displayed on the mobile terminal according to a direction of a photographed or projected image, if an image is photographed or projected using a video module provided to the mobile terminal.

2. Discussion of the Related Art

Generally, terminals can be classified into mobile/portable terminals and stationary terminals according to a presence or non-presence of mobility (portability). Furthermore, the mobile/portable terminals can be classified into a handheld terminal and a vehicle mount terminal according to a presence or non-presence of direct portability of a user.

As functions of the terminals are diversified, the terminals are implemented as multimedia players equipped with composite functions of picture or video photographing, playback of music or video file, game, broadcast reception and the like for example.

Recently, a mobile terminal tends to absorb functions of an independent multimedia device and its unique territory becomes dilute. A recent mobile terminal is capable of taking various still or moving pictures. The taken images are stored in the mobile terminal and then displayed on a display unit provided to the mobile terminal. The images displayed on the display unit can include a taken video, a material or broadcast image received by wire or wireless and the like. Moreover, a mobile terminal, which adopts a projector module as an output means thereof, is being introduced.

A mobile terminal provided with a projector module projects a light in a lateral or front direction of its main body. Yet, if the projected light is applied to a vertical screen or wall, limitation is put on an installation plane, a shape of the mobile terminal or the like. If images are taken for long hours, the same problem may be caused.

In case that images are taken or projected for long hours, a mobile terminal is set to stand by changing an angle of the mobile terminal provided with a projector module or a camera module or a separate holder is used for the mobile terminal, in order to take or project vertical and horizontal images in proper directions. Yet, the use of the separate holder for the mobile terminal is inconvenience and unreasonable.

In case of taking or projecting images using a mobile terminal, it is able to set to check a photographing or projecting process in a manner that the photographed or projected images are displayed on a display unit of the mobile terminal. In case that a photographed or projected direction of an image is changed into a vertical direction from a horizontal direction, a direction of an image displayed on the display unit needs to be changed as well.

SUMMARY OF THE INVENTION

Accordingly, the present invention is directed to a mobile terminal that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a module housing provided with a video module having an image photographing or projecting function, a main body housing provided with a display unit, the main body housing coupled with the module housing to enable the module housing to rotate in at least two directions, and a controller detecting a rotation between the module housing and the main body housing, the controller controlling the video module and the display module, wherein an image photographing or projecting direction of the video module is changed into a horizontal direction or a vertical direction by rotating the module housing and wherein if the rotation of the module housing against the main body housing is detected in the course of photographing or projection of the video module, the controller changes a display direction of a photographed image displayed on the display module or a projected image into the horizontal direction or the vertical direction.

Preferably, the display direction of the photographed image displayed on the display unit controlled by the controller or the projected image corresponds to the photographing or projecting direction of the video module.

Preferably, the module housing is hinged on one end portion of the main body housing and the module housing can be folded in a backside direction opposing a front side of the main body housing provided with the display unit.

More preferably, a recessed loading part is formed on a backside of the main body housing to enable the folded module housing to be loaded therein.

Preferably, after the module housing has been changed in the horizontal direction or the vertical direction, if an image photographing or projecting signal is inputted, the controller controls the display unit to display an image in the display direction corresponding to the photographing or projecting direction of the video module.

Preferably, in case that a layer-structure touchpad is provided to the display unit, if a touch input is applied to the display unit, a control menu is selectively displayed together with a photographed or projected image.

More preferably, the control menu includes at least one control menu corresponding to a control input for controlling the video module.

More preferably, the control menu is not displayed on the photographed or projected image but is displayed on the display unit only.

In another aspect of the present invention, a mobile terminal includes a first main body housing, a second main body housing rotatably connected to the first main body housing, a display unit provided to either the first main body housing or the second main body housing, at least one user input unit provided to either the second main body housing or the first main body housing, a projector module converting a video signal to a projected light to project, the projector module configured to change a projecting direction of the projected light into a horizontal direction or a vertical direction, and a controller controlling the display unit and the projector module, wherein the controller changes a display direction of a projected image displayed on the display unit into the horizontal direction or the vertical direction by detecting that the projection direction of the projector module is changed into the horizontal direction or the vertical direction.

Preferably, the projector module is rotatably provided to a hinge part for connecting the first main body housing and the second main body housing rotatably.

Preferably, the projector module is provided to a lateral side of the first or second main body housing and projects an image in a lateral direction.

More preferably, the projector module is provided to the main body housing to enable a horizontal image to be horizontally projected while the first or second main body housing provided with the projector module is on a horizontal level.

In this case, if an open angle between the first main body housing and the second body housing is detected as about 90 degrees, the controller changes the display direction of the projected image displayed on the display unit into the vertical direction.

More preferably, the projector module is provided to the main body housing to enable a horizontal image to be horizontally projected while the first and second main body housings are fully open.

In this case, if the projector module detects that the first and second main body housings are open at a predetermined angle instead of being fully open, the controller controls the display direction of the projected image displayed on the display unit to be changed into the vertical direction.

And, the predetermined angle for changing the display direction of the projected image displayed on the display unit into the vertical direction is an angle resulting from subtracting about 90 degrees from an angle of a fully open state between the first main body housing and the second body housing.

More preferably, the first main body housing and the second main body housing are rotatably connected together by a free-stop hinge including a pair of cam members having projections and recesses formed repeatedly. If the open angle between the first main body housing and the second main body housing is about 90 degrees, the projections of one of a pair of the cam members are loaded in the recesses of the other one of a pair of the cam members.

Moreover, the first main body housing and the second main body housing are rotatably connected together by a free-stop hinge including a pair of cam members having projections and recesses formed repeatedly. If the first main body housing and the second main body housing are unfolded at an angle reduced by about 90 degrees from a fully open state, the projections of one of a pair of the cam members are loaded in the recesses of the other one of a pair of the cam members.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 16 to 18 are diagrams of a mobile terminal according to another embodiment of the present invention;

FIG. 17 is a diagram of a folder type mobile terminal according to another embodiment of the present invention;

FIG. 18 is a diagram of a folder type mobile terminal according to another embodiment of the present invention;

FIG. 19 is a diagram for one example of a hinge structure available for the mobile terminals shown in FIGS. 2 to 18;

FIG. 24 and FIG. 25 are diagrams for two kinds of examples of an image enlargement mode in case of projecting an image using a mobile terminal according to the present invention.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
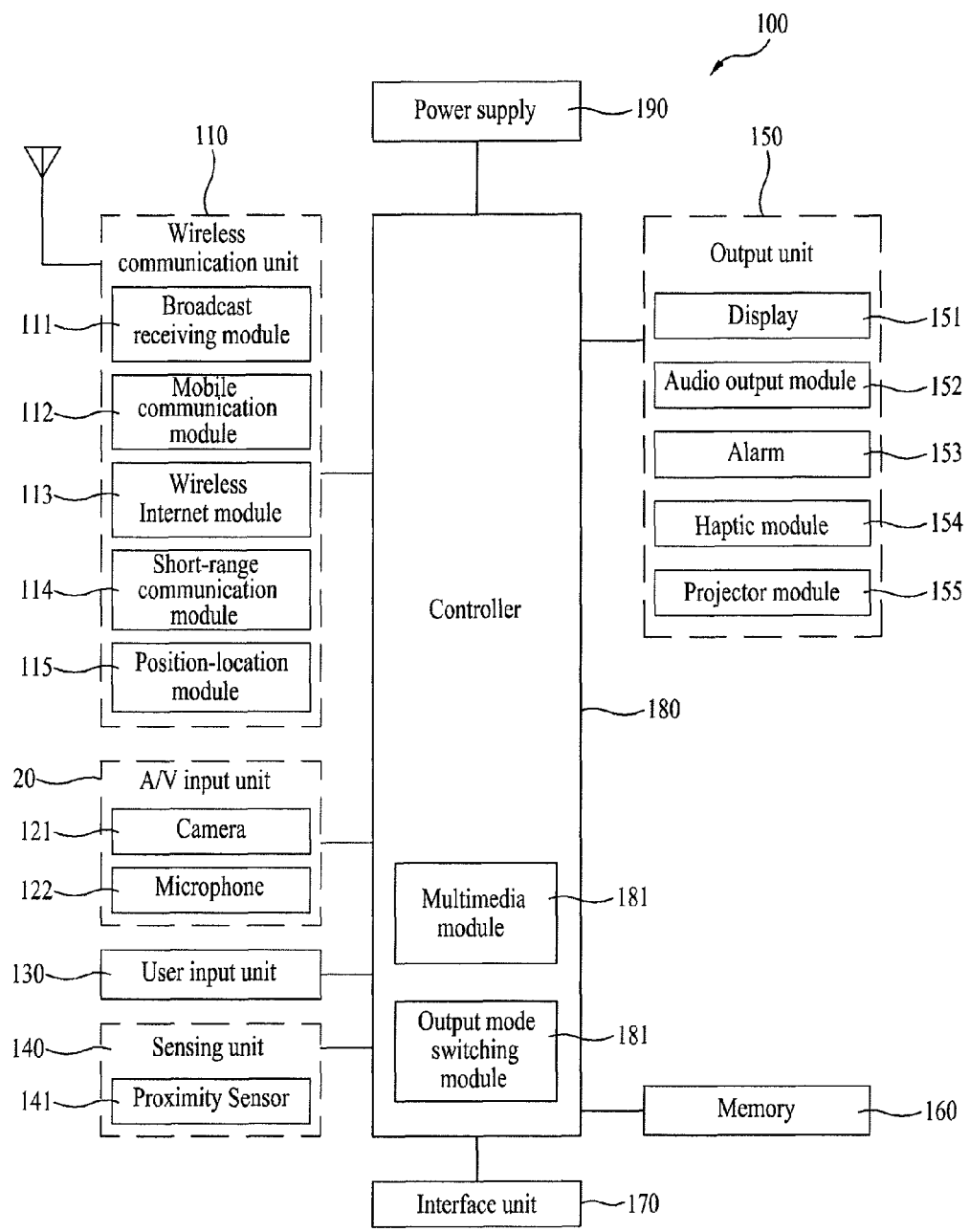
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the A/V (audio/video) input unit 120 is provided for an audio/video signal input and can include a camera module 121 and a microphone 122. The camera module 121 processes frames of such images as still pictures, moving pictures and the like, which are obtained by an image sensor in a video call mode or a photographing mode. The processed image frames are displayed on the display module 151 or can be externally projected by a projector module 155.

The image frames processed by the camera module 121 are stored in the memory 160 or can be externally transmitted via the wireless communication unit 110. At least two camera modules 121 can be provided in accordance with use environments. And, the camera module 121 can include a sensor configured to measure brightness, illumination or the like of a subject for photography.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal.

For instance, if the mobile terminal 100 is a slide phone type, it is able to sense whether a slide phone is open or closed. If the mobile terminal 100 is a folder phone, the sensing unit 140 is able to detect whether a folder is folded or unfolded. Furthermore, in case that an open angle of the folder needs to be recognized step by step for a specific purpose, the sensing unit 140 is able to detect the open angle of the folder. Moreover, the sensing unit 140 is able to sense whether the power supply unit 190 supplies power, whether the interface unit 170 is connected to an external device, and the like. Besides, the sensing unit 140 can include a proximity sensor 141.

The output unit 150 is provided to generate an output related to visual sense, auditory sense, haptic sense or the like. And, the output unit 150 can include a display unit 151, an audio output module 142, an alarm module 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 converts a video signal to a projection light and then projects the projection light. In particular, the projector module 155 converts a still or moving picture taken by the camera module 121 to a projection light and then projects the projection light.

The image or video projected by the projector module 155 can be projected in a manner that an image signal received externally via the wireless communication unit 110 by wire or wireless is converted to a projection light. In case that a moving picture of a subject or the like is taken using the camera module 121, the projector module 155 projects a projection light of an image, which is taken by the camera module 121 or stored in the memory 160, while the audio output module 152 outputs an audio signal, which is inputted via the microphone 122 or stored in the memory 160, as an audio.

Likewise, when a video signal received externally by wireless via the wireless communication unit 110 is projected as a projection light, the audio output module 152 is able to output an audio signal if the audio signal is provided together with the video signal.

For instance, assuming that a horizontal-to-vertical ratio is 4:3 (or 16:9), an image projected by the projector module 155 can be projected in a manner that a horizontal-to-vertical ratio is set to a video ratio of 3:4 (or 9:16) by changing a projection direction of the projector module 155 to facilitate a vertical projection like a document file or a text-oriented presentation. And, its details will be explained later in this disclosure.

The projector module 155 can include such a video device as a transmittive LCD panel, an Lcos panel and the like and is able to use an LED or the like as a light source. Recently, a laser type projector module is introduced as a projector module. The laser type projector module has a very short preheating time and a less power consumption and is applicable to a portable projector.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

Besides, it is able to switch an output mode of the output unit 150 using an output mode switching module 183. For instance, the output mode switching module 183 is able to change a display direction of an image in the display module 151 if a projection direction of an image by the projector module 155 or a photographing direction by the camera module 121 is changed. And, its details will be explained later.

The power supply unit 190 provides power required by the various components for the mobile terminal 100. The power may be internal power, external power, or combinations thereof.

Various embodiments described in this disclosure can be implemented within a computer-readable recording medium or the like using software, hardware or combination thereof for example.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the following description, a mobile terminal is explained with reference to FIG. 2. In particular, the mobile terminal includes a module housing provided with a video module having an image photographing or projecting function, a main body housing provided with a display module, the main body housing coupled with the module housing to enable the module housing to rotate in at least two directions, and a controller detecting a rotation between the module housing and the main body housing, the controller controlling the video module and the display module, wherein an image photographing or projecting direction of the video module is changed into a horizontal direction or a vertical direction by rotating the module housing and wherein if the rotation of the module housing against the main body housing is detected in the course of photographing or projection of the video module, the controller changes a display direction of a photographed image displayed on the display module or a projected image into the horizontal direction or the vertical direction.

Figure 2:
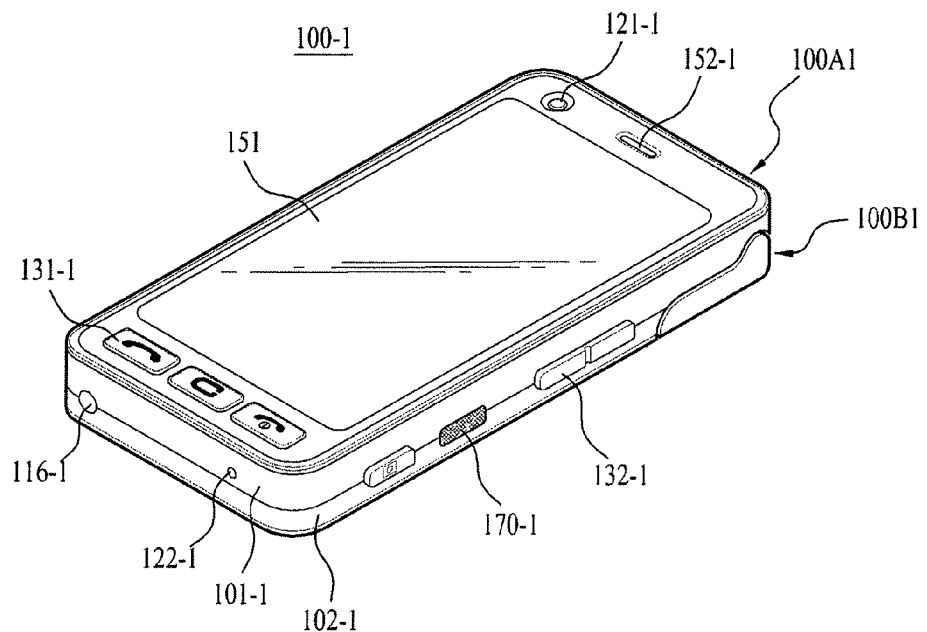
FIG. 2 is a perspective diagram for a front view of a mobile terminal according to one embodiment of the present invention.

FIG. 2 is a perspective diagram for a front view of a mobile terminal 100-1 according to an embodiment of the present invention.

Referring to FIG. 2, a body of a mobile terminal 100-1 can be provided as a bar type, by which the present invention is not-limited. For example, the present invention is applicable to such a structure as a slide type including at least two bodies coupled together rotatably, a folder type, a swing type, a swivel type and the like. And, other embodiments of the present invention will be separately explained later.

First of all, a body includes a case that configures an exterior of the mobile terminal 100-1. According to the present embodiment, the case can include a front case 101-1 and a rear case 102-1. And, various electric and electronic parts are loaded in a space provided between the front case 101-1 and the rear case 102-1. Optionally, at least one middle case can be additionally provided between the front case 101-1 and the rear case 102-1.

These cases are formed by injection molding of synthetic resin or can be formed of such a metal as stainless steel (STS), aluminum (Al), titanium (Ti) and the like.

A display unit 151-1, an audio output unit 152-1, a first camera module 121-1, a user input unit 130-1/131-1 and 132-1, a microphone 122-1, and interface unit 170-1 and the like can be provided to the terminal body, and mainly to, the front case 101-1.

As mentioned in the foregoing description, in case that a mutual layer structure (hereinafter named a touchscreen) is constructed by the display unit 151-1 and a sensor (hereinafter named a touch sensor) for detecting a touch action, it is able to use the display unit 151-1 as an input device of the user input unit as well as an output device. In this case, as mentioned in the foregoing description, the touch sensor can include a touch film, a touch sheet, a touchpad or the like for example.

The touch sensor can be configured to convert such variation as a pressure applied to a specific part of the display unit 151-2, an electrostatic capacitance generate from a specific part of the display unit 151-2 and the line to an electric input signal. And, the touch sensor can be configured to detect a pressure of a touch as well as a touched position or a touched area.

If there is a touch input to the touch sensor, signal(s) corresponding to the touch input is sent to a touch controller. The touch controller processes the signal(s) and then transfers corresponding data to the controller 180 shown in FIG. 1. Therefore, the controller 180 is aware which region of the display unit 151-2 is touched.

An audio output unit 152-1 and a first camera module 121-1 are arranged in the region adjacent to one of both end portions of the display unit 151-1, while a first user input unit 131-1 and a microphone 122-1 are arranged in the region adjacent to the other end portion. A second user input unit 132-1, an interface unit 170-1 and the like can be provided to lateral sides of the front case 101-1 and the rear case 102-1.

A user input unit is provided to receive an input of a command for controlling an operation of the mobile terminal 100-1. And, the user input unit can include the first user input unit 131-1 and the second user input unit 132-1.

Each of the user input units 131-1 and 132-1 can adopt any system including a manipulation unit performed by a user in a tactile manner.

Contents inputted by the first and second user input units 131-1 and 132-1 can be set in various ways. For instance, the first user input 131-1 is able to receive such an input of a command as a start, an end, a scroll and the like. And, the second user input unit 132-1 can receive such an input of a command as a level control of audio outputted from the audio output unit 152-1, a switching to a touch recognition mode of the display unit 151-1 and the like.

Figure 3:
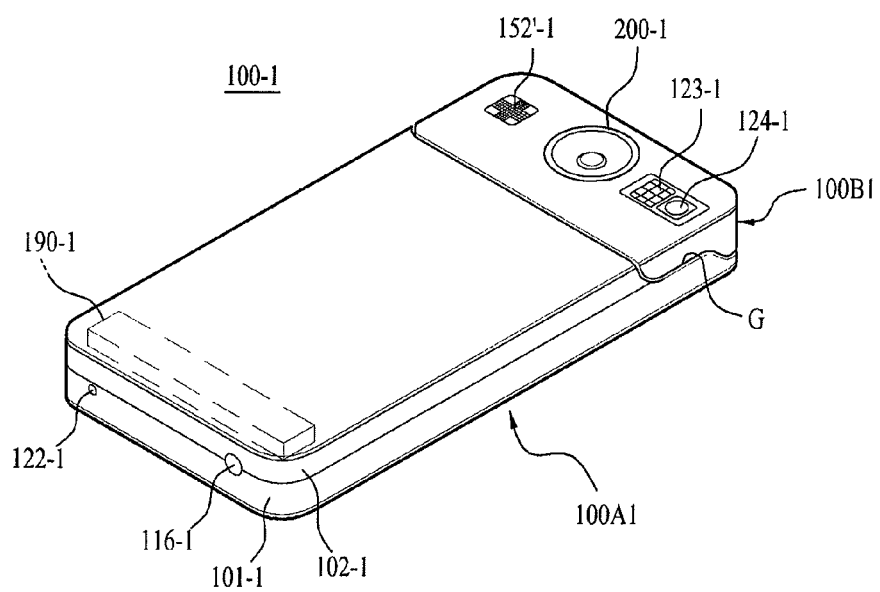
FIG. 3 is a perspective diagram for a backside view of the mobile terminal shown in FIG. 2.

FIG. 3 is a perspective diagram for a backside view of the mobile terminal shown in FIG. 2.

Referring to FIG. 3, a module housing 100B1 is provided to a main body housing 100A1 to adjust a coupled angle with the main body housing 100A1. The module housing 100B1 can be hinged on the main body housing 100A1 to enable a rotation against the main body housing 100A1. In this case, the module housing 100B1 can include at least one video module 200-1 provided with a lens.

The video module 2001 can include either a camera module or a projector module for example.

The video module 200-1 is configured to include a light-measuring sensor for measuring illumination required for photographing or projection, brightness or illumination of a subject or the like. And, the video module 200-1 can be modulized into one unit.

If the video module 200-1 is a camera module, the video module 200-1 corresponds to the A/V input unit shown in FIG. 1. In this case, the photographed image information is stored in the memory 160 or can be externally transmitted via the wireless communication module 110.

If the video module 200-1 is a projector module, the projector module is able to project a projection light converted from a video signal received externally via the wireless communication unit 110 by wireless, a video signal stored in the memory 160 or a video signal which is broadcast signal received by the broadcast receiving module 111.

If photographing is performed for long hours at the same spot using the video module or a projection light converted from a video signal is projected via the video module, it is difficult for a user to perform the photographing or projection by holding the mobile terminal. Therefore, it is necessary to perform the photographing or projection by fixing the mobile terminal to a prescribed place.

For instance, after a mobile terminal has been fixed to a table or the like, it is able to project an image on a projection plane or take a picture of a subject.

In this case, in order to implement an optimal photographing angle or a projection angle according to an installation position of the video module 200-1 within the mobile terminal, it is necessary to change a photographing angle or a projection angle of the video module 200-1.

Therefore, it is necessary to configure the module housing 100B1 to be rotatable against the main body housing 100A1 while accommodating the video module 200-1 therein.

The module housing 100B1 provided with the video module 200-1 may have a size smaller than that of the main body housing 100A1. This is because the module housing 100B1 provided with the video module 200-1 is the housing separately provided to facilitate the video module 200 to be rotated.

If a thickness of the mobile terminal 100-1 is relatively small, the video module 200-1 can be installed in a manner that a lens of the video module 200-1 is externally exposed at a front, rear or lateral side of the housing that forms an exterior of the main body.

While the mobile terminal 100-1 is fixed to a prescribed place, in order to perform photographing or projection, the mobile terminal 100-1 is fixed in a manner that the housing of the mobile terminal 100-1 stands vertically (if the video module 200-1 is provided to the front side or backside of the mobile terminal 100-1) or is maintained to lie down (if the video module 200-1 is provided to the lateral side of the housing). Yet, when the mobile terminal is set to stand vertically, if a separate structure is not provided, it is difficult to enable the housing to stand vertically. If the mobile terminal is set to lie down, a photographed or projected image is interfered with a fixed plane.

In particular, even if the project module is provided as the video module 200-1, it is difficult to project a projection light in a specific direction using the projector module 155 provided to the front side or backside of the housing except a special case that a wall playing a role as a screen or a separate screen exists over the mobile terminal.

Hence, the module housing 100B1 can be coupled with the main body housing to enable a coupled angle to be adjustable. According to the embodiment shown in FIG. 2 or FIG. 3, the module housing 100B is hinged on the main body housing 100A1.

In particular, one end portion of the main body housing 100A1 and one end portion of the module housing 100B1 are rotatably hinged on each other. And, the module housing 100B1 is coupled to be folded on a backside of the main body housing 100A1 opposing the front side of the main body housing 100A1 to which the display unit 151-1 is provided.

Therefore, the module housing 100B1 is hinged on one end portion of the main body housing 100A1 so that the module housing 100B1 can be folded in a backside direction that opposes the front side on which the display unit of the main body housing 100A1 is provided.

A recessed loading part G can be provided to the backside of the main body housing 100A1 to enable the module housing 100B1 to be loaded therein while the module housing 100B1 is folded. If the loading part G is formed, the module housing 100B1 can be loaded therein in part. Therefore, it is able to reduce a thickness of a part of the module housing 100B1 in a backside direction of the mobile terminal while the module housing 100B1 is folded.

In FIG. 3, shown is that the video module 200-1 provided with a lens is provided to the backside of the module housing 100B1.

In case that the video module 200-1 is a camera module, it may have pixels different from those of the former camera module 121-2 shown in FIG. 2.

For instance, the former camera module 121-1 has low pixels enough to take a picture of a user's face to transmit to a correspondent party in the course of video call. Yet, since the latter camera module of the video module 200-1 provided to the second housing 100B1 is not likely to immediately transmit a picture of a general subject which is just taken, the latter camera module can have high pixels.

A flash 123-1 and a mirror 124-1 can be additionally provided adjacent to the video module 200-1. When a subject is photographed via the camera module, the flash 123-1 supplies light to the subject. In case that a user attempts to take a picture of himself (self-photographing), the mirror 124-1 enables the user to see an image of himself reflected on the mirror 124-1.

An audio output unit 152'-1 can be additionally provided to the backside of the module housing 100B1. The audio output unit 152'-1 is able to implement a stereo effect or function together with the former audio output unit 152-1 shown in FIG. 2 and can be used for implementation of a speakerphone mode in the course of a phone call. Optionally, the latter audio output unit 152'-1 can be provided to the main body housing 100A1 instead of the module housing 100B1.

The audio output unit 152'-1 can have an output different from that of the former audio output unit 152-1 shown in FIG. 2. For instance, the latter audio output unit 152'-1 provided to the module housing 100B1 can have an output greater than that of the former audio output unit 152-1.

A broadcast signal receiving antenna 116-1 can be additionally provided to the lateral side of the main body housing 100A1 as well as the antenna for communication and the like. The antenna 116-1 constructing the broadcast receiving module 111 shown in FIG. 1 in part can be provided to be extractable from the terminal body.

A power supply unit 190-1 can be provided to the main body housing 100A1 to supply power to the mobile terminal 100-1. The power supply unit 190-1 is built in the main body housing 100A1. Alternatively, the power supply unit 190-1 can be externally provided to the terminal body in a manner of being directly detachable from the terminal body. In this case, the power supply unit 190-1 can include a rechargeable battery.

Figure 4:
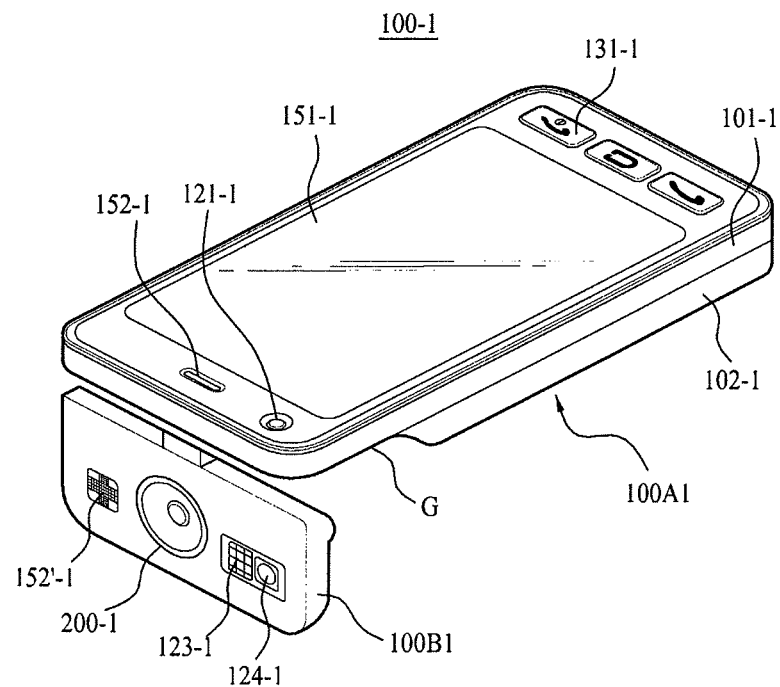
FIG. 4 is a diagram of the mobile terminal shown in FIG. 2 or FIG. 3, in which a main body housing and a module housing are unfolded.

FIG. 4 is a diagram of the mobile terminal shown in FIG. 2 or FIG. 3, in which a main body housing 100A1 and a module housing 100B1 are unfolded. In particular, FIG. 4 shows that the module housing 100B1 is rotated against the main body housing 100A1. As mentioned in the foregoing description, since the module housing 100B1 is provided with the video module 200-1 having the lens, the mobile terminal, which is fixed to a table or the like, is able to take a picture of a subject existing in a horizontal direction of the table or can project an image on such a projection plane provided in a vertical direction of the table such as a screen, a wall and the like.

One end portion of the module housing 100B1 is hinged on one end portion of the main body housing 100A1. The other end portion of the module housing 100B1 plays a role as a support against a fixed plane to which the mobile terminal is fixed. Therefore, it is able to adjust a photographing or projection angle of the video module 200-1 provided to the module housing 100B1.

If an image projected or photographed by the video module 200-1 is configured to be represented via the display unit 151-1 entirely or in part, it is able to check the photographed or projected image via the display unit 151-1. And, it is able to control an additional photographing or projection work.

In particular, the video module 200-1 provided to the module housing 100B1 is rotated against the main body housing 100A1 to adjust the photographing or projection angle of the module housing 100B1 provided with the video module 200-1.

Figure 5:
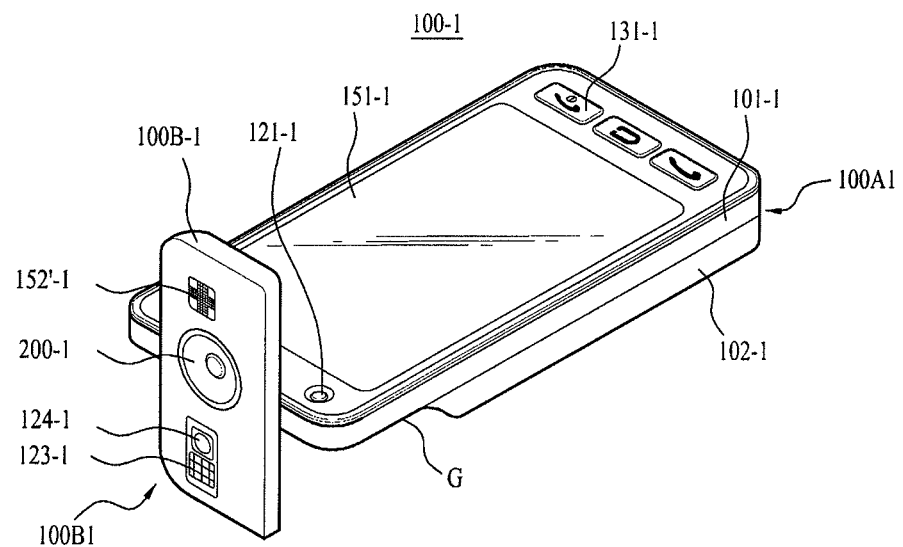
FIG. 5 is a diagram of the mobile terminal shown in FIG. 4, in which a module housing is rotated again against a main body housing.

FIG. 5 is a diagram of the mobile terminal 100-1 shown in FIG. 4, in which a module housing 100B1 is rotated again against a main body housing 100A1.

For instance, while the mobile terminal 100-1 is fixed to a prescribed place, after the module housing 100B1 has been rotated against the main body housing 100A1, if the module housing 100B1 is rotated by 90 degrees with reference to a photographing or projection direction of the video module 200-1, photographing in a vertical direction is possible in case of photographing. And, it is also able to switch to an output mode enabling a vertical length of a projected image to be longer than a horizontal length of the projected image in case of projection on a screen.

Preferably, a hinge enabling the main body housing 100A1 and the module housing 100B1 to be rotatably connected is able to provide a rotational frictional force enough for its adjusted angle to be maintained while the mobile terminal 100-1 is fixed to the prescribed place.

In particular, it is necessary to provide a rotational frictional force enough for the unfolded angle shown in FIG. 4 or FIG. 5 not to be changed by itself. Moreover, the rotational frictional force is set to avoid a considerable force to rotate the module housing 100B1 against the main body housing 100A1.

In the embodiments shown in FIG. 4 and FIG. 5, the module housing 100B1 provided with the video module 200-1 can be hinged on the main body housing 100A1 using two shafts to be rotated by at least two angles. In particular, the module housing 100B1 and the main body housing 100A1 are connected via a pair of independently orthogonal hinge shafts (or ball hinges) of a hinge part (not shown in the drawings) to be rotatable in two directions. Therefore, it is able to change the photographing or projection angle of the image from the video module 200-1 into two directions.

Specifically, referring to FIG. 4 and FIG. 5, if the module housing 100B1 provided with the video module 200-1 is rotated by 90 degrees, it is able to change the photographing or projection angle of image in a horizontal or vertical direction.

Thus, the image photographed or projected by the video module 200-1 can be simultaneously displayed on the display unit 151-1.

In particular, in order to check an image projecting or photographing process, it is necessary to display the image on the display unit 151-1 simultaneously.

For instance, the image projected by the video module 200-1 can be the image stored in the memory 160 of the mobile terminal and can be an image in a horizontal direction (hereinafter called a horizontal image) or an image in a vertical direction (hereinafter called a vertical image) according to a type of the image. Yet, if a projected image becomes a vertical image from a horizontal image, it is able to change the projected image by rotating the module housing 100B to facilitate a user to view the projected image.

Yet, it is not easy for the mobile terminal to determine whether an image (a still picture included) is a horizontal image or a vertical image in order to change a display direction of an image displayed on the display unit 151-5.

Therefore, the controller of the mobile terminal detects a rotation of the module housing 100B1 and then changes a display direction of an image photographed or projected by the video module 200-1 into a horizontal direction or a vertical direction in the display unit.

In particular, if a user changes a direction of the projected or photographed image by rotating the module housing 100B1, the sensing unit 140 shown in FIG. 1 detects a rotation of the module housing 100B1 and then transfers a detected signal to the controller 180. The output mode switching module 183 of the controller 180 is then able to change a display direction of the image on the display module 151-1.

Therefore, a direction of an image displayed on the display module 151-1 needs to be changed to correspond to a rotation of the module housing 100B1. And, its details will be explained later in this disclosure.

In the following description, explained with reference to FIGS. 6 to 17 is a mobile terminal capable of selectively projecting a horizontal/vertical image in a horizontal direction or a vertical direction, as shown in FIG. 4 or FIG. 5.

In the following descriptions with reference to FIGS. 6 to 17, the descriptions overlapped with the above-mentioned descriptions with reference to FIGS. 2 to 5 are omitted.

Figure 6:
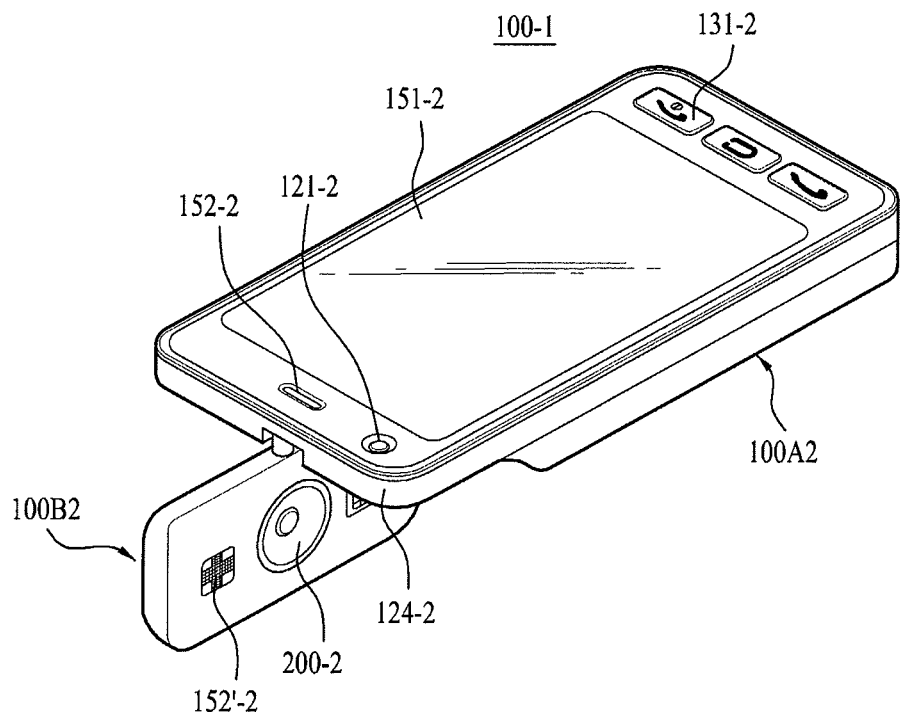
FIG. 6 and FIG. 7 are diagrams of a mobile terminal according to another embodiment of the present invention.
Figure 7:
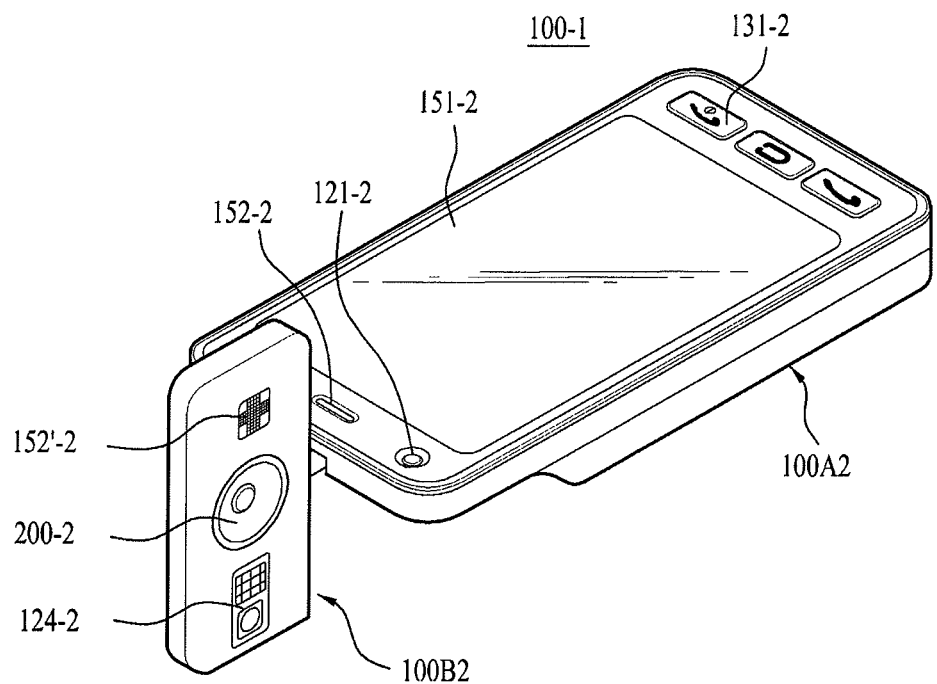

FIG. 6 and FIG. 7 are diagrams of a mobile terminal according to another embodiment of the present invention.

Embodiment shown in FIG. 6 and FIG. 7 differs from the former embodiment shown in FIG. 4 and FIG. 5 in that a direction for a module housing 100B2 provided with a video module 200-2 to project a horizontal image can be a lateral direction of a main body. And, the embodiment shown in FIG. 6 and FIG. 7 also differs from the former embodiment shown in FIG. 4 and FIG. 5 in that a vertical image can be projected or photographed in a lateral direction of a main body housing 100A2 if the module housing 100B2 is rotated again by 90 degrees after having rotated in the lateral direction of the main body.

Like the former embodiment shown in FIG. 4 and FIG. 5, if a plurality of hinge shafts differing from each other in rotational direction or ball hinges are used, it is able to change a direction of the module housing 100B2 into a horizontal direction or a vertical direction.

Figure 8:
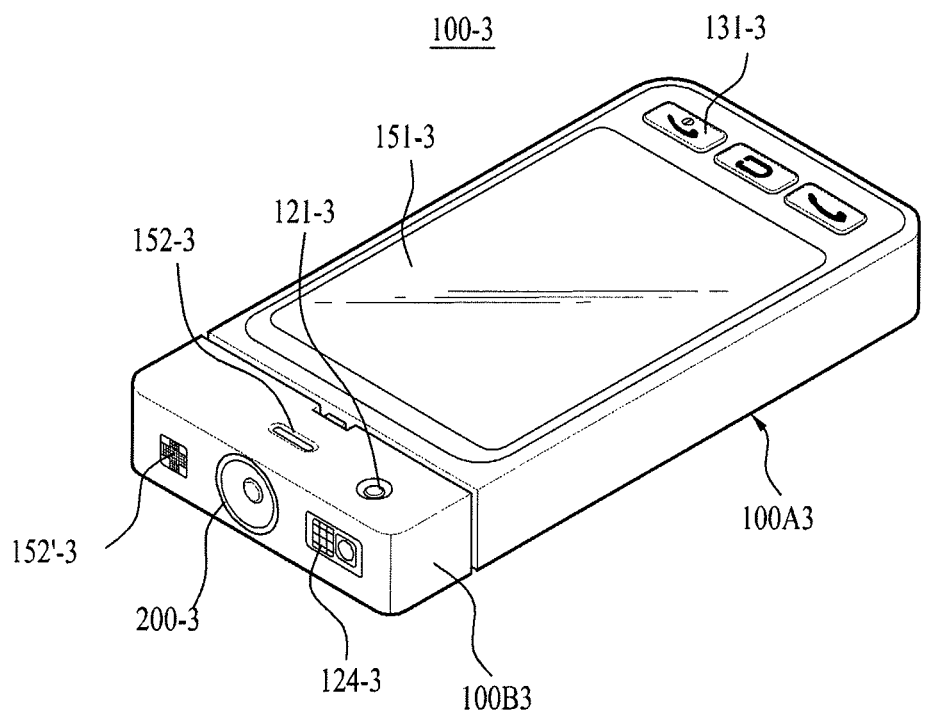
FIGS. 8 to 10 are diagrams of a mobile terminal according to another embodiment of the present invention.
Figure 9:
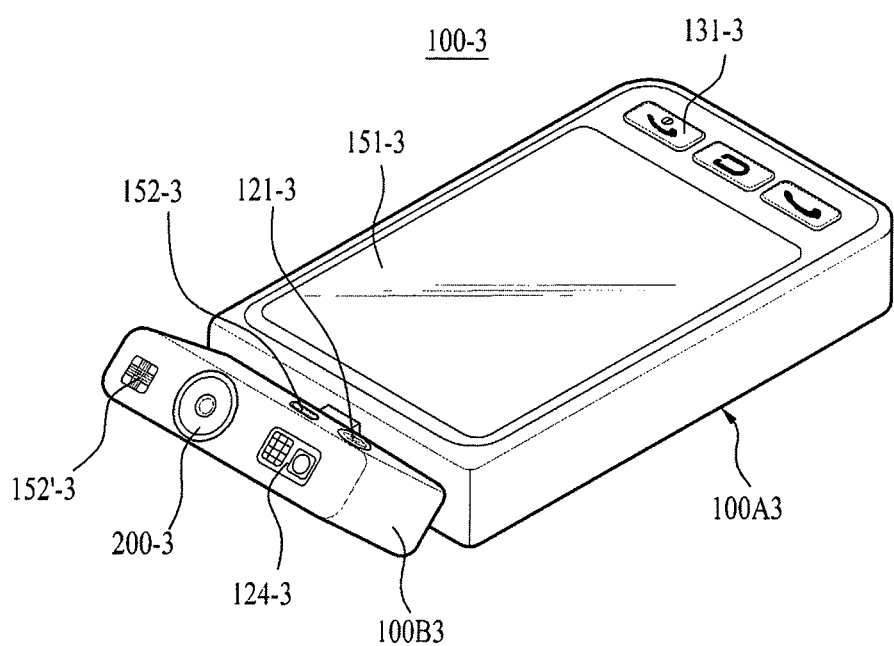
Figure 10:
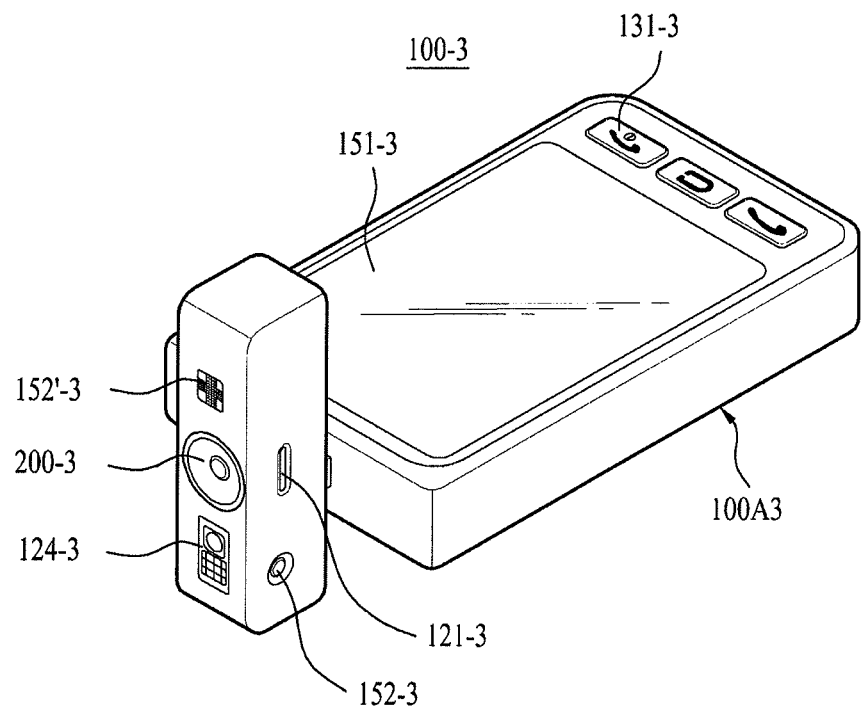

FIGS. 8 to 10 are diagrams of a mobile terminal according to another embodiment of the present invention.

A mobile terminal 100-3 shown in FIGS. 8 to 10 includes a main body housing 100A3 having a display unit 151-3 and a module housing 100B3 hinged on one end portion of the main body housing 100A3 in a length direction. And, the module housing 100B3 includes a video module.

The module housing 100B3 is hinged on a center of one end portion of the main body housing 100A3 to enable rotations in at least two directions.

According to the embodiment shown in FIG. 9, the module housing 100B3 is adjusted in one direction. In particular, it is able to change a projection direction upward to avoid interference with an installation plane in case of projecting a horizontal image using the video module 200-3. In this case, if a photographing direction of a photographed image or a projection direction of a projected image needs to be changed, a user is able to change the direction by rotating the module housing 100B3 in a manner shown in FIG. 10.

Figure 11:
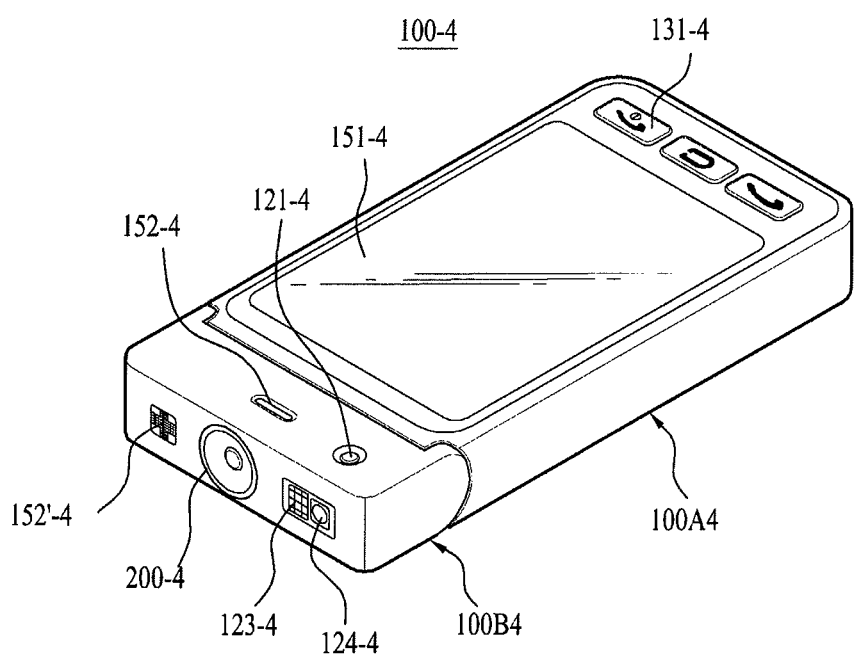
FIGS. 11 to 13 are diagrams of a mobile terminal 100-4 according to another embodiment of the present invention.
Figure 12:
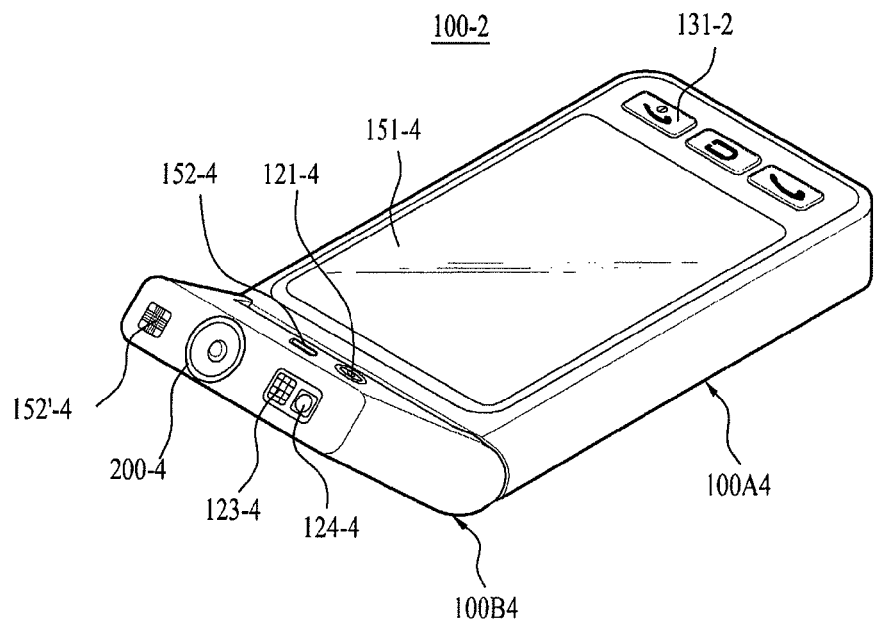
Figure 13:
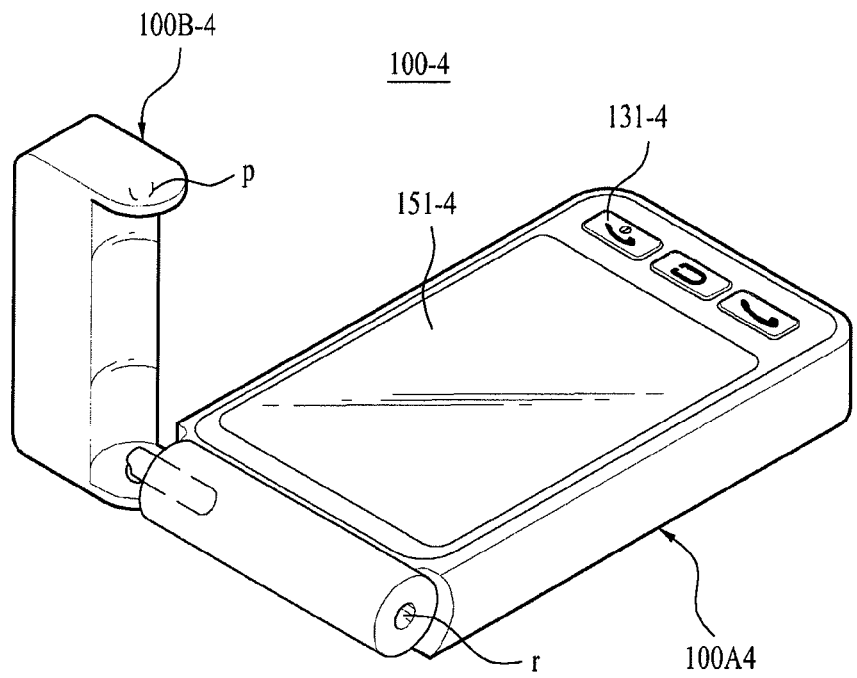

FIGS. 11 to 13 are diagrams of a mobile terminal 100-4 according to another embodiment of the present invention. This embodiment shown in FIGS. 11 to 13 is characterized in that a module housing 100B4 provided with a video module 200-4 is rotated to photograph or project a horizontal/vertical image.

The former embodiments are characterized in that a connected portion between the module housing and the main body housing is connected to a center of a lateral side of one end portion of each of the housings. Yet, the latter embodiment shown in FIGS. 11 to 13 is characterized in that a hinge part for connecting the module housing and the main body housing together includes an edge corresponding to a lateral side of one end portion of each of the housings.

Referring to FIG. 12, if a photographing or projection direction needs to be changed in the course of photographing or projecting a horizontal image upward, the other end portion of the module housing 100B4 is separated from the main body housing instead of the hinge part connected portion of the module housing 100B4 and is then rotated in a vertical direction. Therefore, it is able to photograph or project a vertical image.

Meanwhile, a recess r and a projection p are provided to the other end portion of the module housing 100B4 opposing the hinge part connected portion and the corresponding portion of the main body housing 100A4, respectively, whereby a connected state can be maintained. In this case, the hinge part can be constructed with a ball hinge or the like.

Figure 14:
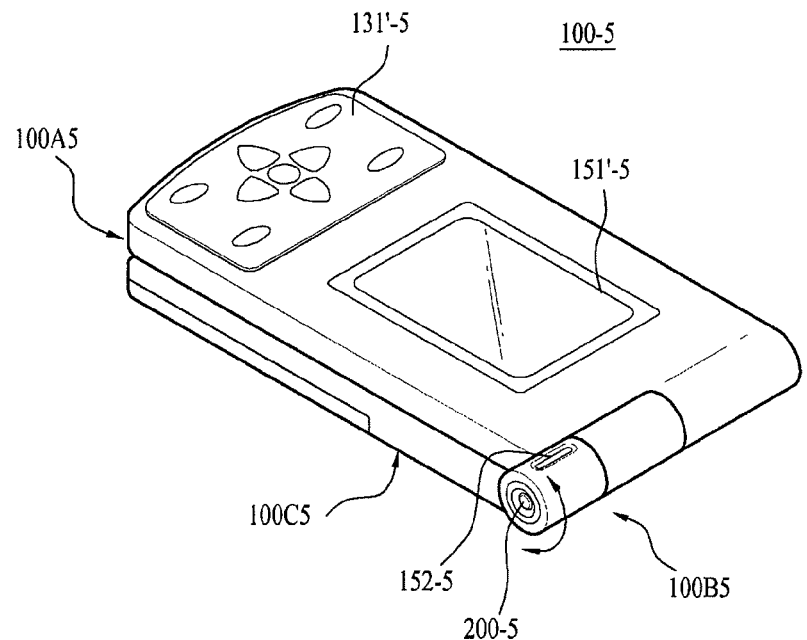
FIG. 14 and FIG. 15 are diagrams of a mobile terminal according to another embodiment of the present invention.
Figure 15:
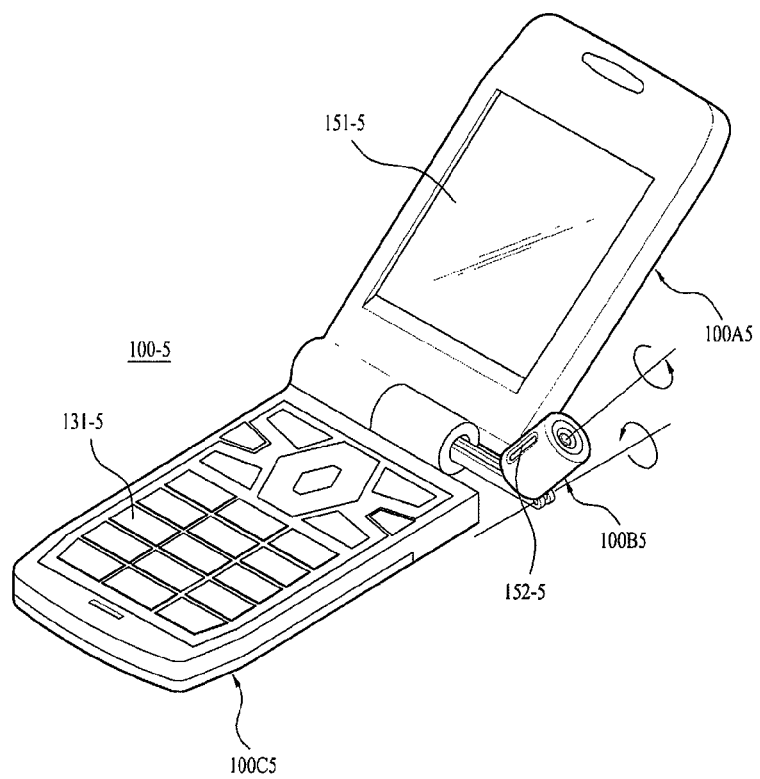

FIG. 14 and FIG. 15 are diagrams of a mobile terminal 100-5 according to another embodiment of the present invention.

This embodiment shown in FIG. 14 and FIG. 15 relates to a folder type mobile terminal.

As mentioned in the foregoing description of the former embodiment, a mobile terminal according to this embodiment of the present invention can include a module housing 100B5 having a video module 200-5. In this case, the module housing 100B5 can be retractably provided to a hinge part enabling a folding function of first and second main body housings 100A5 and 10005 configuring a main body.

The module housing 100B5 provided with the video module 200-5 is provided with an orthogonal dual-shaft hinge and enables a photographing/projection direction of an image to be changed into a horizontal, a vertical direction or an upward direction.

This embodiment shown in FIG. 14 and FIG. 15 is differs from the former embodiments in changing a photographing or projection direction of an image by rotating the module housing 100B5 while the first and second main body housings 100A5 and 10005 are open.

Since an upward projection is possible by extracting the module housing 100B5, it is able to minimize interference with a fixed place to which the mobile terminal is fixed.

A mobile terminal according to the present invention includes a first main body housing, a second main body housing rotatably connected to the first main body housing, a display unit provided to either the first main body housing or the second main body housing, at least one user input unit provided to either the second main body housing or the first main body housing, a projector module converting a video signal to a projected light to project, the projector module configured to change a projection direction of the projected light into a horizontal direction or a vertical direction, and a controller controlling the display unit and the projector module, wherein the controller changes a display direction of a projected image displayed on the display unit into the horizontal direction or the vertical direction by detecting that the projection direction of the projector module is changed into the horizontal direction or the vertical direction.

The mobile terminal according to the present invention is explained in detail with reference to FIGS. 16 to 18 as follows.

Figure 16:
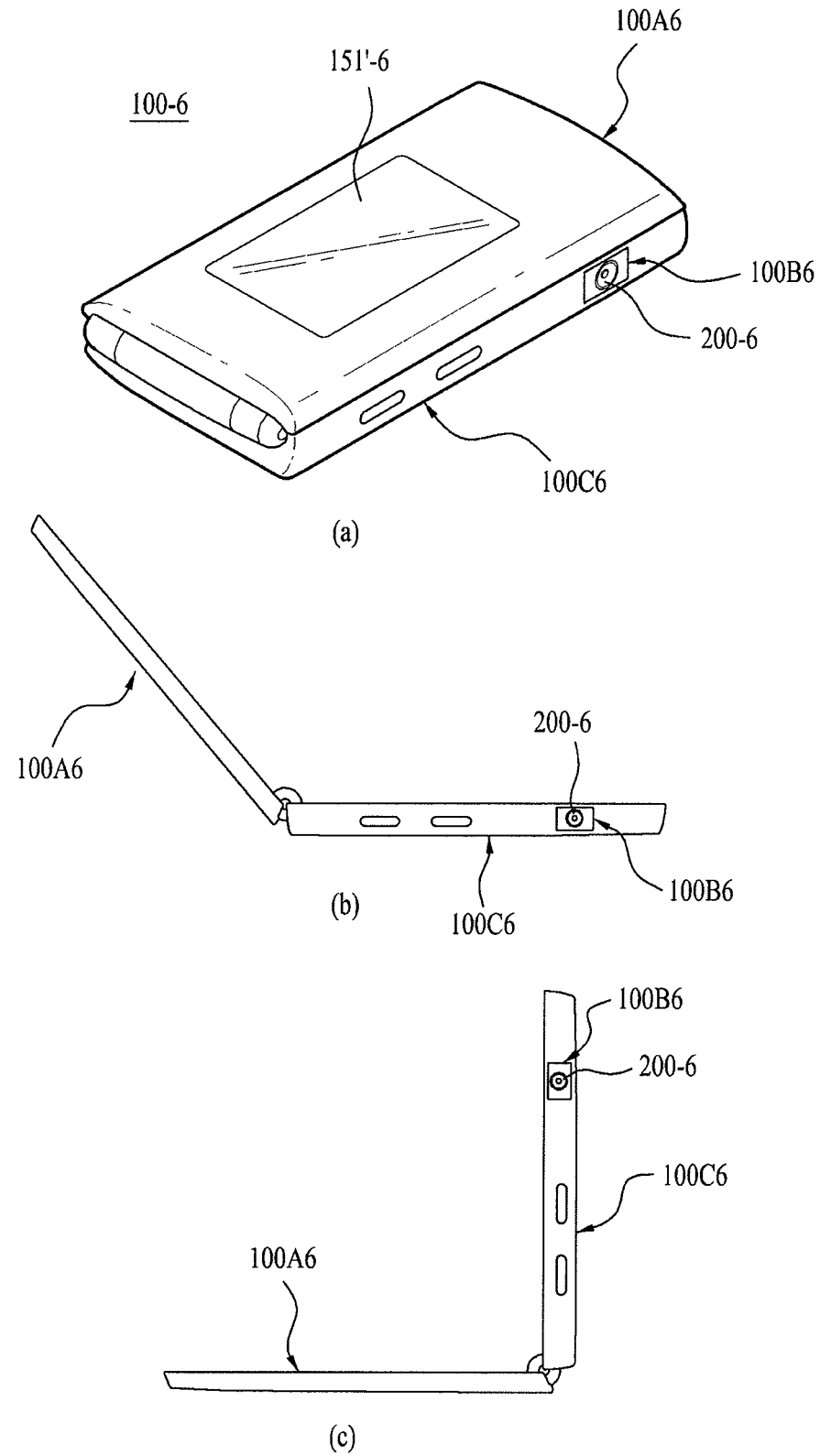

FIGS. 16 to 18 are diagrams of a mobile terminal according to another embodiment of the present invention. In particular, a folder type mobile terminal is shown in FIGS. 16 to 18. In FIG. 16, FIG. 17 or FIG. 18, a mobile terminal can be fixed to a prescribed place in a different way for a photographing or projection of a horizontal/vertical image according to where is a loading position of a video module. The respective cases for a method of fixing a mobile terminal to a prescribed place are explained with reference to FIGS. 16 to 18 as follows.

First of all, a mobile terminal shown in (a) of FIG. 16 is a folder type mobile terminal. This mobile terminal is configured in a manner that a first main body housing 100A6 having a display unit and a second main body housing 100C6 having such a user input unit as a keypad and the like are hinged on each other to be unfolded centering on the hinge of the first and second main body housings 100A6 and 100C6. In this case, the first main body housing 100A6 can be provided with an auxiliary display unit 151'-6.

The mobile terminal according to the present invention includes a module housing 100B6 provided with a video module 200-6. And, the module housing 100B6 is provided to the second main body housing 100C6 having the user input unit.

If the second main body housing 200C6 is on a horizontal level, assume that the video module 200-6 provided to the second main body housing 100C6 photographs or projects a horizontal image in a horizontal direction.

Referring to (b) of FIG. 16, an image photographed or projected by the video module 200-6 provided to the second main body housing 100C6 can be projected or photographed while the second main body housing 100C6 maintains a horizontal level. Yet, if a type of a subject or a type of a stored image corresponds to a horizontal direction, the second main body housing 100C6 needs to stand upright to change a projection direction into a vertical direction from a horizontal direction.

The mobile terminal shown in FIG. 16 can be unfolded by an angle over 90 degrees if the first main body housing 100A6 and the second main body housing 100C6 are unfolded. Hence, in the unfolding process of the housings, there exists an angle that makes an open angle between the first main body housing 100A6 and the second main body housing 100C6 90 degrees.

Thus, without rotating the module housing 100B6 itself, it is able to change the photographing or projection direction of an image into the vertical direction from the horizontal direction by changing a posture of the main body housing.

In a general folder type mobile terminal, it is not easy to fix an angle in the course of the main body housing unfolding process. In particular, since the first main body housing 100A6 and the second main body housing 100C6 need not to maintain 90 degrees in-between, they are configured to be unfolded by the angle shown in (b) of FIG. 16 once the main body housing starts to be unfolded.

Yet, in order to change an image photographing/projecting direction into a vertical direction from a horizontal direction, a function of selecting an angle instead of a semi-automatic opening operation of the main body housing can be provided. Its details will be explained with reference to FIG. 19 later.

In (c) of FIG. 16, shown is a case that a mobile terminal is fixed to a prescribe place by making the second main body housing 100C6 stand upright. In this manner, it is able to change an projection or photographing direction of image.

As the projection or photographing direction of image is changed, a display direction of image by the main body housing can be automatically changed in a following manner. First of all, according to the embodiment shown in FIG. 16, an angle between the first main body housing 100A6 and the second main body housing 100C6 is detected. If there is an angle change of the main body housing shown in (b) of FIG. 16 to make the in-between angle in a fully open or closed state, it is ale to change a projection direction of image displayed on the display unit into a vertical/horizontal direction from a horizontal/vertical direction.

The automatic change of the display direction of the image in the display unit can be performed in a following manner. First of all, the sensing unit 140 shown in FIG. 1 is able to detect whether the mobile terminal 100 is open or closed or whether a folder of a folder type phone is fully unfolded. Furthermore, the sensing unit recognizes an open angle of the folder step by step. If the open angle between the first main body housing 100A6 and the second main body housing 100C6 is changed into 90 degrees in the course of the image photographing or projection of the video module 200-6 while the first and second main body housings 100A6 and 100C6 are closed or fully open, the output mode switching module 183 of the controller is able to change the display direction of the image on the display unit.

FIG. 17 is a diagram of a folder type mobile terminal according to another embodiment of the present invention. The mobile terminal shown in FIG. 17 differs from the former embodiment shown in FIG. 16 in that a place to which a video module 200-7 is provided is a first main body housing 100A7 to which a display unit and the like are provided.

Since a module housing 100B7 is provided to the first main body housing 100A7, if a photographing direction of image needs to be changed into a vertical direction (horizontal direction) from a horizontal direction (vertical direction), the first main body housing 100A7 is rotated by 90 degrees against the second main body housing 100C7.

As the module housing 100B7 is provided to the first main body housing 100A7, this embodiment shown in FIG. 17 differs from the former embodiment shown in FIG. 16 in that a horizontal image can be photographed or projected in a horizontal direction only if the mobile terminal is folded.

Referring to (c) of FIG. 17, a method of fixing the mobile terminal in a manner that the first main body housing 100A7 provided with the module housing 100B7 is made to stand upright or the change between the horizontal image and the vertical image are equivalent to those of the former embodiment shown in FIG. 15, of which details are omitted in the following description.

FIG. 18 is a diagram of a folder type mobile terminal according to another embodiment of the present invention.

This embodiment shown in FIG. 18 and the former embodiment shown in FIG. 17 share the common fact that a video module is provided to a first main body housing provided with a display unit. Yet, they differ from each other in a following fact.

First of all, according to the former embodiment shown in FIG. 17, in order for the video module 100-7 provided to the first main body housing 100A7 to horizontally photograph or project a horizontal image in a horizontal direction, the first main body housing 100A7 and the second main body housing 100C7 should maintain the folded state. In particular, in the embodiment shown in FIG. 17, in order to project a horizontal image horizontally, the module housing 100B7 provided with the video module 100-7 is set to maintain the horizontality of the projected image when the main body housing is folded.

In the embodiment shown in FIG. 17, if a horizontal image is projected in a horizontal direction, the mobile terminal needs to be fixed to an installation plane, as shown in (b) of FIG. 16. Likewise, as interference with the installation plane may be generated in case of image photographing or projection, it is necessary for the mobile terminal to perform photographing or projection by being placed on a separate support.

On the contrary, according to the latter embodiment shown in FIG. 18, a loading direction of the mobile housing 100B8 provided with a vide module 200-8 for photographing or projecting a horizontal image horizontally is set as shown in (b) of FIG. 18. First of all, when the first main body housing 100A8 provided with a display unit and the like and the second main body housing 100C8 provided with such a user input unit as a keypad and the like are fully unfolded, a horizontal image can be horizontally photographed or projected. Of course, it is able to set a vertical image to be vertically photographed or projected.

When the first main body housing 100A8 and the second main body housing 100C8 provided with the user input unit such as the keypad and the like are fully unfolded, if a horizontal image is set to be horizontally photographed or projected, the projector module needs to be set in a following manner. First of all, if it is detected that the first main body housing and the second main body housing are not fully unfolded but are unfolded by a preset angle, the controller needs to control a display direction of a projected image displayed on the display unit to be changed into a vertical direction.

Since a fully unfolded angle of a folder type mobile terminal has an unfolded angle ranging between 150 and 170 degrees, if a video module or a module housing is loaded to enable a horizontal image to be horizontally (vertically in case of a vertical image) photographed or projected in a fully unfolded state, as shown in (b) of FIG. 18, a predetermined angle may have 60 to 80 degrees resulting from subtracting 90 degrees from the fully unfolded angle. If the first main body housing 100A8 and the second main body housing 100C8 are unfolded by this angle, a projection or photographing angle of a projected image can be changed into the vertical direction from the horizontal direction.

In this case, if the a photographing or projection direction of a photographed or projected image is changed by a rotation of the housing, the change of the display direction of the image on the display unit and a method of fixing an unfolded state of the main body housing to a specific angle are equivalent to those of the former embodiment.

FIG. 19 is a diagram for one example of a hinge structure available for the mobile terminals shown in FIGS. 2 to 18. In particular, this hinge structure is applicable to a case that an unfolded angle of a main body housing in the embodiment shown in FIGS. 16 to 18 is maintained at a specific angle instead of being maintained in a fully unfolded state.

The hinge structure shown in FIG. 19 is an example of a so-called free-stop hinge. In particular, in the course of an opening or closing operation in which a connection angle between two main body housings rotatably connected together via a hinge is varying, this hinge structure enables an open angle to be maintained step by step.

In particular, once an opening process is initiated, an open angle of a main body housing proceeds to a fully open state but an intermediately open state can be maintained instead of the fully open state.

In (a) of FIG. 19, shown is a partially enlarged diagram of a cam part of a free-stop hinge. In (b) of FIG. 19, shown is a conceptional diagram for a free-stop principle by a cam of the free-stop hinge shown in (a) of FIG. 19.

First of all, the free-stop hinge 300 can include a cam member having at least one projection and recess. According to the embodiment shown in FIG. 19, the projection and the recess of the cam members 310 and 320 have shapes corresponding to each other. Therefore, while the projection 311 of the first cam member 310 is inserted in the recess 323 of the second cam member 320, it is able to maintain an open angle by the free-stop hinge 300.

In case that the free-stop hinge 300 is applied to the mobile terminal shown in FIGS. 16 to 18, the first main body housing 100A and the second main body housing 100B can be coupled with specific cam members of the first and second cam members 310 and 320, respectively.

The cam members are provided to a hinge shaft 340 to guide relative rotations of the cam members and can further include an elastic member 330 providing an elastic repulsive power to correspond to displacements of the cam members 310 and 320.

The elastic member 330 applies an elastic force in a direction of locking the cam members 310 and 320 together. If the projections of the cam members 310 and 320 come into contact with each other in case of the relative rotations of the cam members 310 and 320, the elastic member 330 applies the elastic force to enable the projection to slide in the recess.

In particular, if a user of the mobile terminal attempts to adjust an open angle of the main body housing, the user is able to adjust the open angle of the main body housing in a manner of rotating the cam members relatively by overcoming the elastic force of the elastic member 330 while a specific open angle is maintained.

After the open angle of the main body housing has been adjusted into a specific angle, image photographing or projection is enables.

In (b) of FIG. 19, the free-stop principle by the cam of the free-stop hinge is shown. If the projection 321 and recess 323 of the second cam member 320 are formed as shown in (b) of FIG. 19, the projection 311 of the first cam member 310 is loaded in the spaced recess 323 of the second cam member 320 to maintain an open angle of the folder housing.

The step I shown in (b) of FIG. 19 indicates a case that an open angle of a main body housing is about 20 degrees. The step II shown in (b) of FIG. 19 indicates a case that an open angle of a main body housing is about 90 degrees. And, the step III shown in (b) of FIG. 19 indicates a case that an open angle of a main body housing is about 160 degrees (almost fully open state).

In case that the free-stop hinge 300 shown in FIG. 18 is used, it is able to maintain the open angle of the main body housing at 90 degrees. Therefore, it is able to change a photographing or projection direction of image in the embodiment shown in FIG. 16 or FIG. 17 into a vertical direction from a horizontal direction. Since it is able to maintain the open angle of the main body housing at 70 degrees, it is able to change a photographing or projection direction of image in the embodiment shown in FIG. 17 into a horizontal direction from a vertical direction.

Although (b) of FIG. 19 illustrates that an angle selectable by the free-stop hinge can be variously selected, since an open angle of a main body housing of a mobile terminal according to the present invention intends to change a photographing or projection direction of image by a video module into a vertical direction from a horizontal direction, the number or gap of recesses of the free-stop hinge is provided according to necessity. Therefore, it is ale to selectively change the photographing or projection direction of image.

Figure 20:
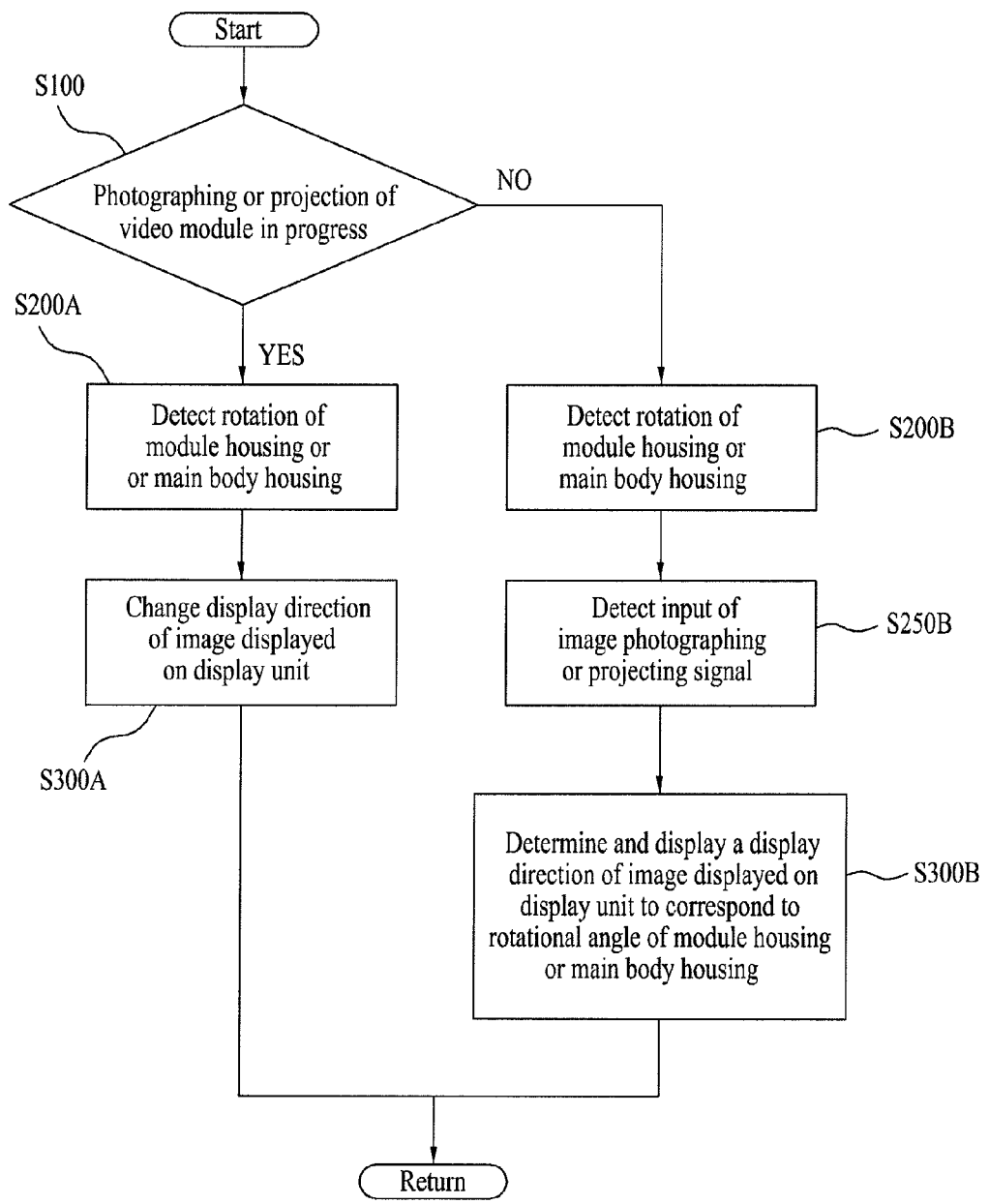
FIG. 20 is a flowchart of a process for changing a display direction of a display unit provided to a mobile terminal according to the present invention.

FIG. 20 is a flowchart of a process for changing a display direction of a display unit provided to a mobile terminal according to the present invention, in which a photographing or projection direction of image is changed by rotating a module housing provided with a video module in the mobile terminal (or, a main body housing provided with a module housing).

As mentioned in the foregoing description, in case that a horizontal image and a vertical image are projected, a mobile terminal according to the present invention is characterized in that a direction of an image displayed on the display unit 151 is changed.

First of all, in case that the video module 200 is photographing or projecting an image, the sensing unit 140 shown in FIG. 1 detects a rotation of the module housing or the main body housing provided with the module housing.

As mentioned in the foregoing description, the sensing unit 140 detects such a current status of the mobile terminal 100 as an open/closed state of the mobile terminal 100, a presence or non-presence of user's contact, a direction of the mobile terminal, acceleration/deceleration of the mobile terminal and the like and then generates a sensing signal for controlling an operation of the mobile terminal 100. For instance, in case that the mobile terminal 100 is a slide phone type, the sensing unit 140 is able to sense whether a slide phone is open or closed. In case that the mobile terminal 100 is a folder phone, the sensing unit is able to sense whether a folder is folded or unfolded. Furthermore, in case that an open angle of the folder needs to be recognized step by step to perform a specific purpose, the sensing unit 140 is able to determine the open angle of the folder.

In particular, the mobile terminal according to the present invention is provided with a video module (e.g., a camera module or a projector module) for photographing or projection of an image. And, the mobile terminal can be set to change a display direction of an image displayed on the display unit 151 as soon as the module housing including the video module or the main body housing is rotated.

Thus, in order to set the display direction of the image, which is displayed on the display unit 151, to be changed as soon as the modeling housing including the video module or the main body housing is rotated, the sensing unit 140 needs to detect a rotation of the modeling housing including the video module or the main body housing or a rotation angle thereof in order to determine whether a user attempts to change the display direction of the image on the display unit 151.

The rotation of the module housing including the video module or the main body housing or the change of the rotation angle can be performed in the course of or before photographing or projecting an image.

If the rotation of the module housing including the video module or the main body housing is detected in the course of photographing or projecting the image [S200A], the output mode switching module 183 of the controller is able to change a display direction of the image displayed on the display unit 151 [S300A].

While the image is not photographed or projected, after the rotation of the module housing including the video module or the main body housing has been detected [S200B], if a command for photographing or projecting an image using the video module is inputted via the user input unit 130 shown in FIG. 1, the output mode switching module 183 of the controller is able to change the display direction of the image displayed on the display unit 151 into a rotation direction of the module housing including the video module or the main body housing or the rotational angle thereof [S300B].

In brief, if the photographing or projection direction of the video module 200 is changed into a horizontal direction or a vertical direction by the rotation of the module housing in the course of the photographing or projection of the video module, the controller 180 changes the display direction of the image on the display unit 151 into the horizontal direction or the vertical direction.

After the photographing or projection direction of the video module has been changed into the horizontal direction or the vertical direction by the rotation of the module housing, if a photographing or projecting signal of the image is inputted, the controller 180 controls the display unit to display the image in the display direction corresponding to the photographing or projection direction of the video module.

Figure 21:
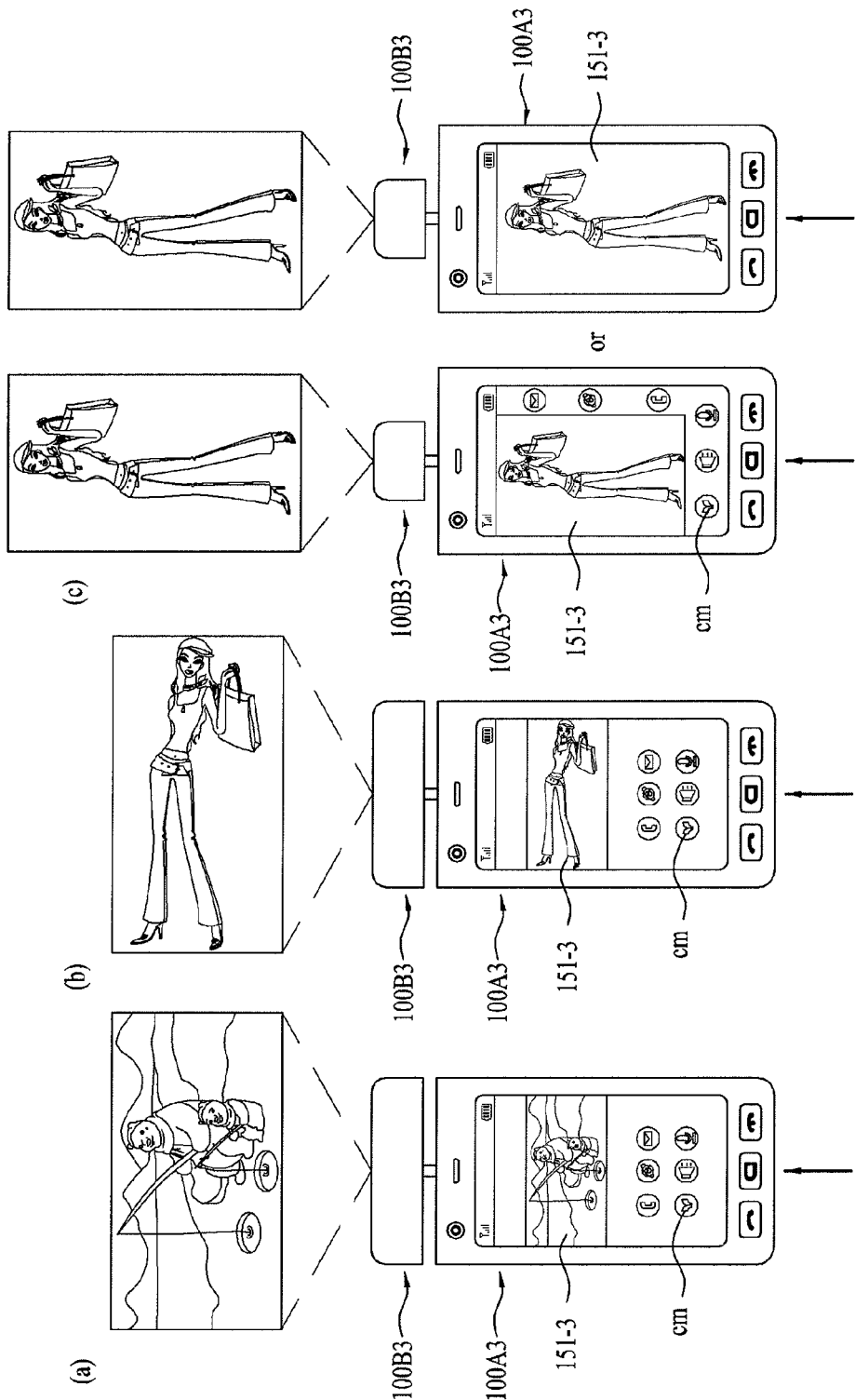
FIG. 21 is a diagram for an example of changing a display direction of an image on a display unit in accordance with a change of an image photographing or projecting direction in a mobile terminal according to the present invention.

FIG. 21 is a diagram for an example of changing a display direction of an image on a display unit in accordance with a change of an image photographing or projecting direction in a mobile terminal according to the present invention.

In the following description with reference to FIG. 21, the mobile terminal shown in FIGS. 8 to 10 is taken as an example.

First of all, a mobile terminal 100-3 shown in FIG. 21 includes a main body housing 100A3 having a display unit 151-3 and a module housing 100B3 rotatably hinged on one end portion of the main body housing 100A3 in a length direction. In this case, the module housing 100B3 includes a video module 200-3. The module housing 100B3 is hinged on a center of the one end portion of the main body housing 100A3 to be rotatable in at least two directions.

In this case, assume that the video module 200-3 provided to the module housing 100B3 is a projector module for projecting an image. And, assume that the video module 200-3 projects a horizontal image while the video module 200-3 is not rotated against the main body housing 100A3.

In (a) of FIG. 21, shown is a state that the video module 200-3 projects a horizontal image. An arrow marked below the mobile terminal indicates a direction in which a user watches a screen and the mobile terminal.

Referring to (a) of FIG. 21, an image projected on the screen is a horizontal image. This horizontal image can include a moving picture or a still picture. And, the still picture may include a text document. Therefore, while the horizontal image is projected, the module housing 100B3 needs not to be rotated.

And, an image will be displayed on the display unit 151-3 in a horizontal direction as well. In case that the display unit 151-3 adopts a full-touchscreen system, a long display unit will be provided in a length direction of the mobile terminal. Hence, in case that a horizontal image is displayed in a horizontal direction, a control menu (cm) for controlling the mobile terminal or the photographing or projection of the image can be displayed on the display unit 151-3 except a region on which the image is displayed.

Assuming that a touchpad of a layer structure is provided to the display unit 151-3, if a touch pressure is applied to the display unit 151-3, the control menu cm can be selectively displayed on the display unit 151-3 together with the photographed or projected image.

In this case, the control menu cm can include at least one control menu corresponding to a control input for controlling the video module provided to the module housing 100B3.

Optionally, the control menu cm can be displayed on the display unit 151-3 only without being displayed on the photographed or projected image.

In (b) of FIG. 21, shown is a state that a vertical image is projected by the video module 200-3 of the mobile terminal. In this case, the vertical image shown in (b) of FIG. 21 can include a document or image file.

Since the mobile terminal is unable to determine whether the projected image is a horizontal image or a vertical image by itself, an image projected on the screen can be projected in a manner that a vertical image is turned to lie down in a horizontal direction, as shown in (b) of FIG. 20.

And, an image displayed on the display unit 151-3 of the mobile terminal can be displayed in a manner that a vertical image is turned to lie down in a horizontal direction as well.

Yet, unlike the case of displaying a horizontal image in a horizontal direction, if a vertical image is displayed long in a horizontal direction, it is a waste of an area of the display unit. In case that a vertical image is projected in a horizontal direction, it is inconvenient for a user to watch a projected image.

In case that a vertical image is projected, as shown in (b) of FIG. 21, it is able to change a projected direction of an image by rotating the mobile terminal entirely. If the mobile terminal is fixed to a table or the like to watch or present an image for long hours, it is not easy to rotate the whole mobile terminal in a direction for uprighting the mobile terminal.

Referring to (c) of FIG. 21, if the module housing 100B3 provided with the projector module is rotated, an image projected on a screen or wall is rotated to project a vertical image in a vertical direction. Therefore, it is convenient for a user to view the projected image.

In the mobile terminal according to the present invention, as the module housing provided with the projector module or the main body housing is rotated, if a direction of a projected image is changed into a vertical (horizontal) direction from a horizontal (vertical) direction, a direction of an image displayed on the display unit is correspondingly changed as well.

If a rotation of the module housing or the main body housing is detected by the sensing unit 140, the output mode switching module 183 of the controller 180 changes a display direction of an image displayed on the display unit 151 into a direction corresponding to a rotational direction of the module housing including the video module or the main body housing or a rotational angle thereof.

In (c) of FIG. 21, shown is an example that a display direction of an image displayed on the display unit 151-3 is changed into a vertical direction from a horizontal direction by the output mode switching module 183 of the controller.

In case that a display direction of an image displayed on the display unit 151-3 is vertical, a vertical image is displayed on the whole display unit 151-3 by omitting a case that a control menu cm is displayed together.

Optionally, the control menu cm can be displayed only if a touch input signal is applied by a user.

In particular, while an image is displayed on the whole display unit 151-3, if a user touches the display unit or the like, it is able to configure the control menu cm to be popped up. Alternatively, it is able to set the control menu cm to be simultaneously projected on the screen [not shown in the drawing].

Figure 22:
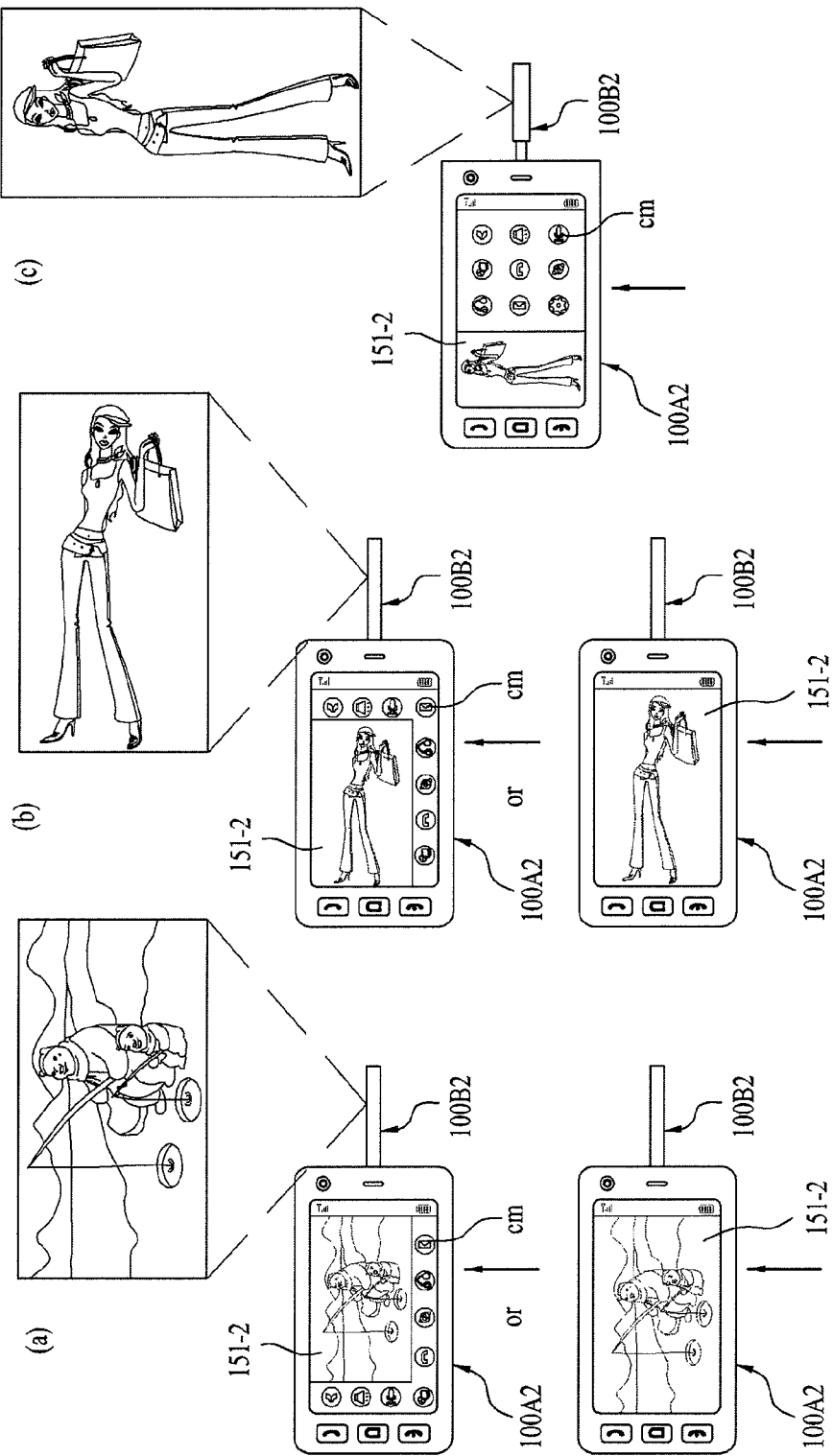
FIG. 22 is a diagram for another example of changing a display direction of an image on a display unit in accordance with a change of an image photographing or projecting direction in a mobile terminal according to the present invention.

FIG. 22 is a diagram for another example of changing a display direction of an image on a display unit in accordance with a change of an image photographing or projecting direction in a mobile terminal according to the present invention.

Unlike the former example shown in FIG. 21, an example shown in FIG. 22 illustrates a case that an image projected by a projector module is projected from a lateral side of the mobile terminal. In particular, FIG. 22 shows a case that an image is projected using the mobile terminal shown in FIG. 6 and FIG. 7.

Hence, a display unit 151-2 watched by a user is placed long in a horizontal direction. If a horizontal image is displayed, as shown in (a) of FIG. 22, a method of displaying an image on the display unit 151-2 can adopt a method of displaying an image together with a control menu cm or a method of displaying an image on the whole display unit. And, it is also able to display an image only if a touch input signal is applied by a user.

In (b) of FIG. 22, a vertical image is projected in a horizontal direction. And, an image displayed on the display unit 151-2 is displayed in a manner that the vertical image is turned to lie down horizontally. In this case, if a user rotates the module housing 100B2, as shown in (c) of FIG. 22, as mentioned in the foregoing description of the former embodiment, a direction of a projected image can be changed into a vertical direction.

In this case, an image displayed on the display unit 151-2 is changed in a vertical direction. Since a fixed direction of the display unit 151-2 is a horizontal direction, if a vertical image is displayed in a vertical direction, a control menu cm and the like can be displayed on a remaining region of the display unit 151-2.

Figure 23:
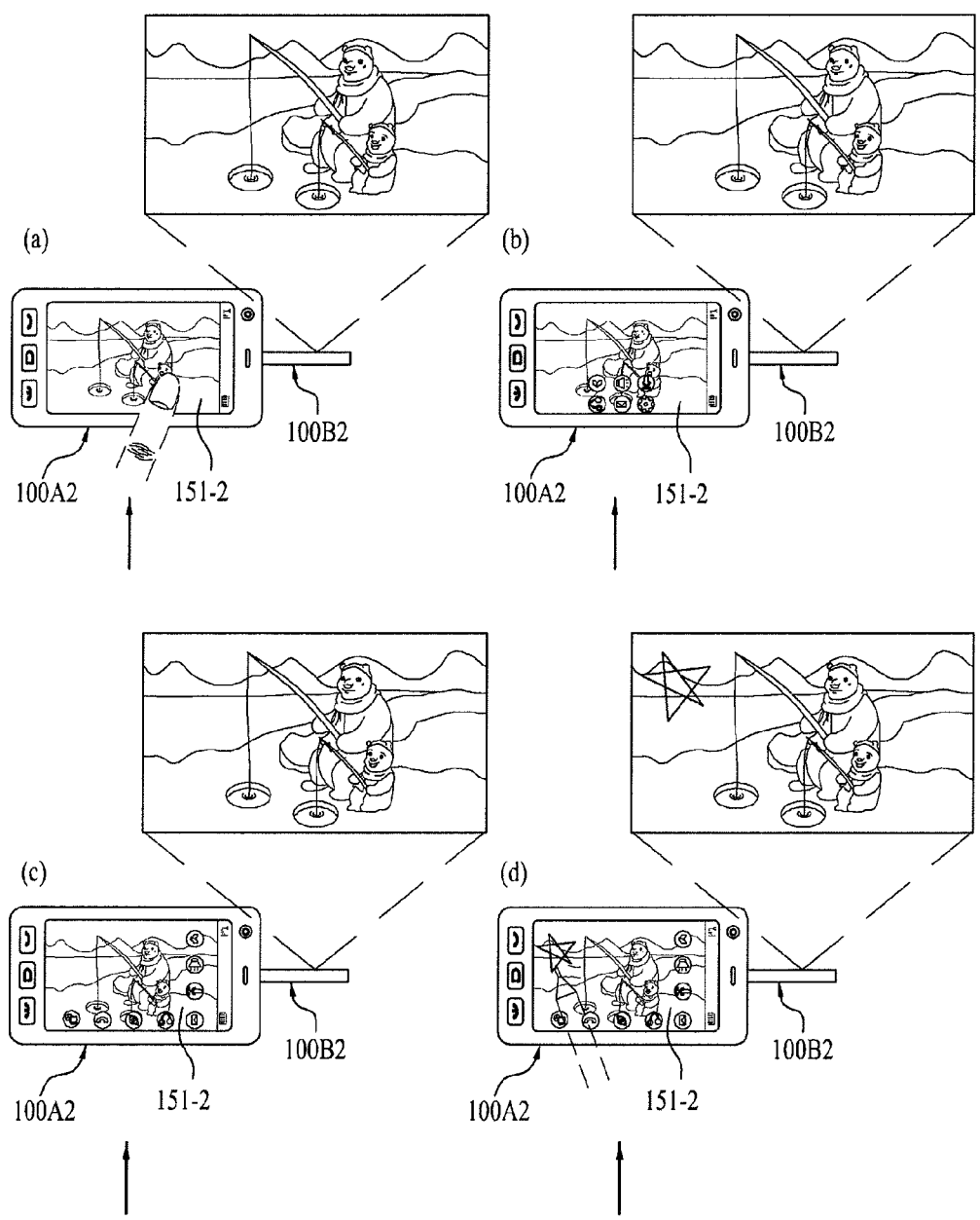
FIG. 23 is a diagram for a control menu activating process in case of a vertical projection shown in FIG. 22.

FIG. 23 is a diagram for a control menu activating process in case of a vertical projection shown in FIG. 22. Assume that a mobile terminal shown in FIG. 23 performs a horizontal projection to project an image in a lateral direction of a housing.

Referring to FIG. 23, in case of a horizontal projection, a display unit 151-2 is able to display a horizontal image on a whole screen.

Yet, if a user's touch input or the like is applied to a display unit having a touch sensor, a control menu can be activated as shown in (b) or (c) of FIG. 23. Since the activated control menu needs not be always projected, it is able to determine whether to project the control menu according to a user's setting. In (b) or (c) of FIG. 23, the activated control menu is not projected as a projection light.

In this case, if a memo is performed on a region of the display unit 151-2 for displaying a projected image, as shown in (d) of FIG. 23, the same memo can be projected on an image projected on a screen.

In particular, if a prescribed input is applied to a region for displaying a projected image in an image displayed on a display unit of a mobile terminal, it is able to set a prescribed image of the input to be projected on the projected image.

Figure 24:
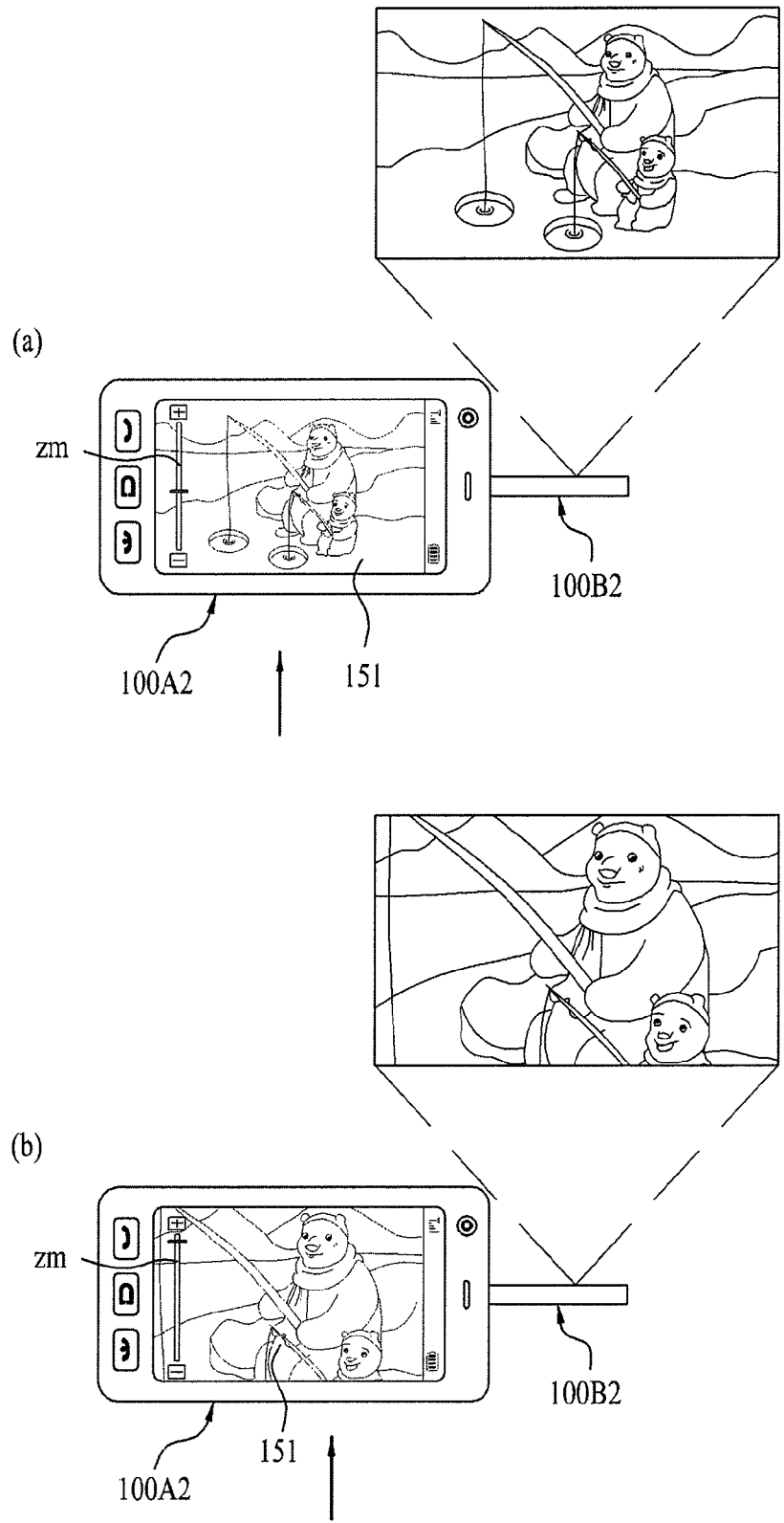

FIG. 24 and FIG. 25 are diagrams for two kinds of examples of an image enlargement mode in case of projecting an image using a mobile terminal according to the present invention. In particular, FIG. 24 shows a case that an image displayed on a display unit and an image projected on a screen or the like are identically enlarged.

In (a) of FIG. 24, shown is a state that a zoom menu for enlarging an image is activated by such a user input as a user's touch signal and the like. In (b) of FIG. 24, shown is a state that an image is enlarged and projected according to a manipulation of the zoom menu zm. If there is not other user setting, when an image is enlarged by a manipulation of the zoom menu zm, a predetermined part of an image (e.g., a central part of the image) can be enlarged despite the same size of a projected image.

FIG. 25 shows a state that a region A selected by a user is enlarged and projected.

Referring to FIG. 25, in case of attempting to enlarge and project a character of a portrait or the like, if a user manipulates a popped-up zoom menu zm and selects a specific selected region A by touch & drag, an image displayed on a display unit 151 is not enlarged but the selected region A can be set to be enlarged and projected only.

Of course, it is able to set the selected region to be identically displayed as an enlarged projection of the image on the display unit 151.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a module housing provided with a video module having a projecting mode in which the module housing projects a projected image onto an external screen;
   a main body housing provided with a display unit displaying the projected image, coupled to the module housing, and configured to enable the module housing to rotate in at least two directions, the main body having a recessed loading part formed on a backside of the main body housing and configured to enable the folded module housing to be loaded therein; and
   a controller configured to determine whether or not the projecting mode is in progress, to detect a rotation between the module housing and the main body housing, and to control the video module and the display unit,
   wherein if the rotation between the module housing and the main body housing is detected while the projecting mode is in progress, a display direction of the projected image projected on the external screen is changed as a result of the rotation of the module housing and the controller is configured to change a display direction of the projected image on the display unit in correspondence with the detected rotation so that the projected image on the display unit is synchronized with the projected image on the external screen,
   wherein if the projected image on the display unit is enlarged, the controller is further configured to identically enlarge the projected image projected on the external screen with the enlarged projected image on the display unit,
   wherein the module housing is hinged on one end portion of the main body housing, and
   wherein the module housing is configured to be folded in a backside direction opposing a front side of the main body housing.

2. The mobile terminal of claim 1, wherein if the rotation between the module housing and the main body housing is detected while the projecting mode is not in progress, and if a projecting input command is detected, the controller is configured to change a display direction of a to-be-projected image displayed on the display unit in correspondence with the detected rotation.

3. The mobile terminal of claim 1, further comprising:
   a layer-structure touchpad provided to the display unit,
   wherein if a touch input is applied to the display unit, the controller is configured to control the display unit to selectively display a control menu together with the display direction of the projected image.

4. The mobile terminal of claim 3, wherein the control menu comprises:
   a control input configured to enable a user to control the video module.

5. The mobile terminal of claim 3, wherein the controller is configured to control the display unit to display the control menu on the display unit without displaying the control menu on the projected image on the external screen.

* * * * *